US012586009B2

(12) United States Patent
Romagnoli et al.

(10) Patent No.: US 12,586,009 B2
(45) Date of Patent: Mar. 24, 2026

(54) METHODS, APPARATUSES AND COMPUTER PROGRAM PRODUCTS FOR GENERATING AN INCIDENT AND CHANGE MANAGEMENT USER INTERFACE

(71) Applicants: ATLASSIAN PTY LTD., Sydney (AU); ATLASSIAN US, INC., San Francisco, CA (US)

(72) Inventors: Jose Romagnoli, Sydney (AU); Jeremey Barrett, Sydney (AU); Michael Ruflin, Elizabeth Bay (AU); Alison Winterflood, Sydney (AU); Radu Apostoleanu, Sydney (AU); Caroline Helen Bartle, Golspie (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 270 days.

(21) Appl. No.: 18/066,722

(22) Filed: Dec. 15, 2022

(65) Prior Publication Data

US 2023/0206144 A1 Jun. 29, 2023

Related U.S. Application Data

(60) Provisional application No. 63/266,149, filed on Dec. 29, 2021.

(51) Int. Cl.
G06Q 10/0631 (2023.01)
(52) U.S. Cl.
CPC ............................. G06Q 10/06311 (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | | |
|---|---|---|---|---|---|
| 5,625,682 | A | * | 4/1997 | Gray ..................... | H04M 3/523 |
| | | | | | 379/88.07 |
| 7,225,139 | B1 | * | 5/2007 | Tidwell .......... | G06Q 10/063114 |
| | | | | | 705/7.15 |
| 10,445,170 | B1 | * | 10/2019 | Subramanian ......... | G06N 20/10 |
| 10,515,096 | B1 | * | 12/2019 | Choudhary ............. | H04L 43/08 |
| 11,310,129 | B1 | * | 4/2022 | Szczepanik ............. | H04L 67/02 |
| 2007/0208698 | A1 | * | 9/2007 | Brindley ........... | G06F 16/24549 |
| 2009/0313219 | A1 | * | 12/2009 | Gupta ................... | G06Q 10/10 |

(Continued)

*Primary Examiner* — Alan S Miller
(74) *Attorney, Agent, or Firm* — Alston & Bird LLP

(57) ABSTRACT

Various embodiments herein described are directed to methods, apparatuses and computer program products configured for improving human-computer interactions and interfaces in integrated service and asset management platforms. In some embodiments, an integrated service and asset management platform may generate and store ticket data objects (for example, incident ticket data objects and/or change ticket data objects). When a new ticket data object (for example, an incident ticket data object and/or a change ticket data object) is received by the integrated service and asset management platform, the integrated service and asset management platform may select one or more related ticket data objects. Additional example embodiments provide various example incident and change management user interfaces that facilitate various user inputs and software operations in the integrated service and asset management platform.

20 Claims, 13 Drawing Sheets

(56)                   References Cited

U.S. PATENT DOCUMENTS

| | | | | |
|---|---|---|---|---|
| 2010/0131315 A1* | 5/2010 | Gilbert | .................. | G06Q 10/10 |
| | | | | 705/7.38 |
| 2011/0107250 A1* | 5/2011 | Boykin | ................. | G06Q 10/10 |
| | | | | 715/781 |
| 2016/0103891 A1* | 4/2016 | Choudhary | ............. | G06F 16/26 |
| | | | | 707/722 |
| 2017/0017368 A1* | 1/2017 | Maheshwari | ........... | H04L 41/22 |
| 2017/0178038 A1* | 6/2017 | Guven | ................. | G06Q 30/016 |
| 2017/0366582 A1* | 12/2017 | Kothekar | ............. | H04L 63/1425 |
| 2019/0356682 A1* | 11/2019 | Hadden | ............... | G06F 3/04842 |
| 2021/0398137 A1* | 12/2021 | Liu | .......................... | G06N 5/02 |
| 2022/0197898 A1* | 6/2022 | Bharatia | ................. | G06N 3/08 |

* cited by examiner

600

602 — START

604 — RECEIVE AN INCIDENT TICKET
DATA OBJECT

606 — DETERMINE AT LEAST ONE RELATED
CHANGE TICKET DATA OBJECT

608 — END

700

START ⟋701

RECEIVE A CHANGE TICKET DATA OBJECT ⟋703

DETERMINE AT LEAST ONE RELATED INCIDENT TICKET DATA OBJECT ⟋705

END ⟋707

900

START ⟋901

IDENTIFY AT LEAST ONE TICKET TIME
DATA FIELD ⟋903

GENERATE AN INCIDENT AND CHANGE
MANAGEMENT USER INTERFACE ⟋905

END ⟋907

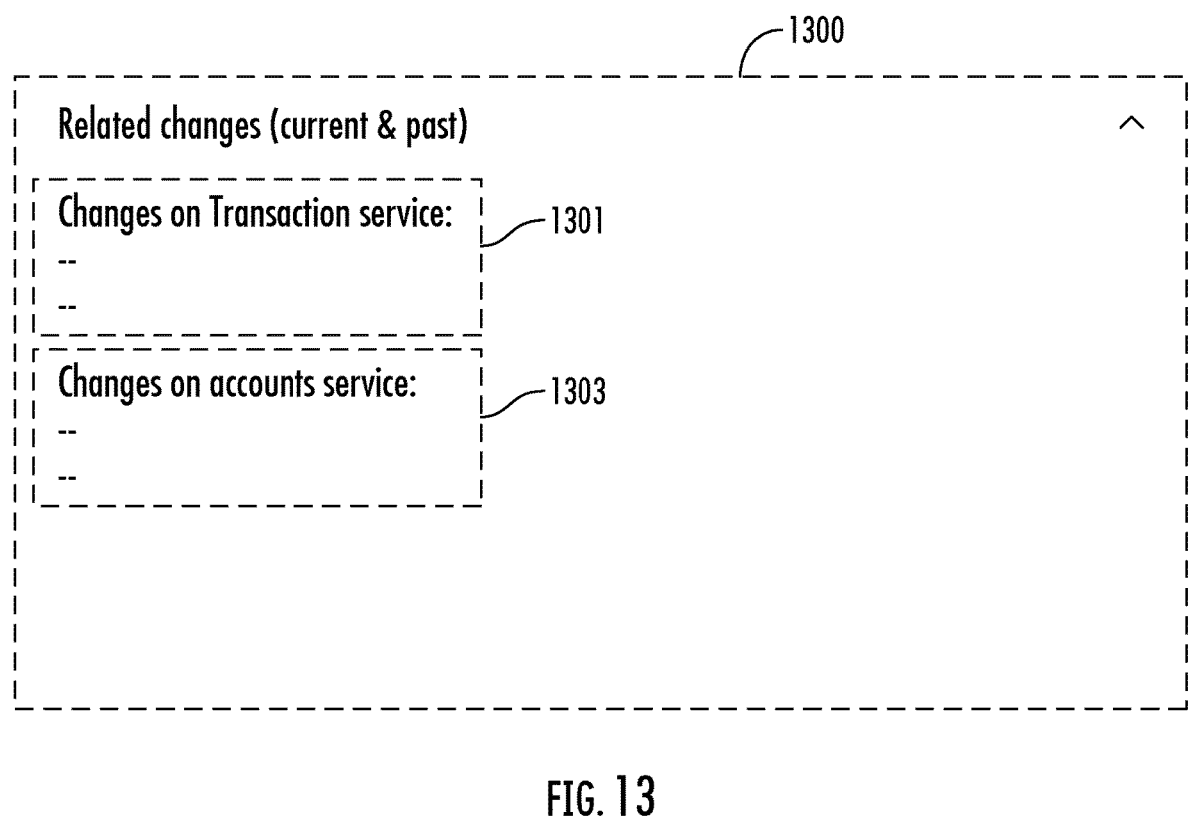

1300

Related changes (current & past)  ∧

Changes on Transaction service: ⌐1301
--
--

Changes on accounts service: ⌐1303
--
--

FIG. 13

METHODS, APPARATUSES AND COMPUTER PROGRAM PRODUCTS FOR GENERATING AN INCIDENT AND CHANGE MANAGEMENT USER INTERFACE

CROSS-REFERENCE TO RELATED APPLICATIONS

The present application claims priority to and benefit of U.S. Provisional Patent Application No. 63/266,149, filed Dec. 29, 2021, the content of which is incorporated by reference in its entirety.

BACKGROUND

Applicant has identified many technical deficiencies and problems associated with human-computer interactions and interfaces in complex computer systems.

BRIEF SUMMARY

In general, embodiments of the present disclosure provide methods, apparatuses, systems, computing devices, and/or the like for improving human-computer interactions and interfaces in integrated service and asset management platforms.

In accordance with various embodiments of the present disclosure, an apparatus for generating an incident and change management user interface associated with an integrated service and asset management platform is provided. In some embodiments, the integrated service and asset management platform is associated with a plurality of service data objects and a plurality of ticket data objects. In some embodiments, the apparatus comprises at least one processor and at least one non-transitory memory comprising program code. In some embodiments, the at least one non-transitory memory and the program code are configured to, with the at least one processor, cause the apparatus to at least receive, from a client device, a ticket data object comprising an affected service data field indicating a service data object from the plurality of service data objects; in response to receiving the ticket data object, determine at least one related ticket data object from the plurality of ticket data objects; and cause rendering, on the client device, the incident and change management user interface based at least in part on the ticket data object, the service data object, and the at least one related ticket data object. In some embodiments, the ticket data object corresponds to at least one of an incident ticket data object or a change ticket data object. In some embodiments, the at least one non-transitory memory and the program code are configured to, with the at least one processor, cause the apparatus to: identify at least one related service data object from the plurality of service data objects based at least in part on the affected service data field of the ticket data object, and select the at least one related ticket data object from the plurality of ticket data objects based at least in part on a corresponding affected service data field of each of the at least one related ticket data object indicating one of the service data object or the at least one related service data object. For example, an integrated service and asset management platform in accordance with various embodiments of the present disclosure may automatically form connections between one issue/ticket and another issue/ticket via their corresponding service object(s).

In some embodiments, the ticket data object comprises the incident ticket data object. In some embodiments, the incident ticket data object indicates at least one service incident notification associated with the service data object. In some embodiments, the at least one related ticket data object comprises at least one related change ticket data object. In some embodiments, the at least one related change ticket data object indicates at least one related service change request associated with the service data object or the at least one related service data object. In some embodiments, the at least one related ticket data object comprises at least one related incident ticket data object. In some embodiments, the at least one related incident ticket data object indicates at least one related service incident notification associated with the service data object or the at least one related service data object.

In some embodiments, the ticket data object comprises the change ticket data object. In some embodiments, the change ticket data object indicates at least one service change request associated with the service data object. In some embodiments, the at least one related ticket data object comprises at least one related incident ticket data object. In some embodiments, the at least one related incident ticket data object indicates at least one related service incident notification associated with the service data object or the at least one related service data object. In some embodiments, the at least one related ticket data object comprises at least one related change ticket data object. In some embodiments, the at least one related change ticket data object indicates at least one related service change request associated with the service data object or the at least one related service data object.

In some embodiments, the service data object comprises a related service data field. In some embodiments, the related service data field indicates at least one child service data object associated with the service data object or at least one parent service data object associated with the service data object.

In some embodiments, the at least one non-transitory memory and the program code are configured to, with the at least one processor, cause the apparatus to: select the at least one related ticket data object from the plurality of ticket data objects based at least in part on the affected service data field of the at least one related ticket data object indicating one of the at least one child service data object or the at least one parent service data object.

In some embodiments, the at least one non-transitory memory and the program code are configured to, with the at least one processor, cause the apparatus to: generate the incident and change management user interface based at least in part on the at least one child service data object or the at least one parent service data object. For example, an example incident and change management user interface may display related child service data objects so that a user can understand downstream impacts during an incident. As another example, an example incident and change management user interface may show related/dependent parent service data objects so that a user can assess associated risks with making such a change. Additional details associated with the incident and change management user interface are described herein.

In some embodiments, the at least one non-transitory memory and the program code are configured to, with the at least one processor, cause the apparatus to: identify at least one ticket time data field associated with the at least one related ticket data object. In some embodiments, the at least one ticket time data field indicates at least one ticket time associated with the at least one related ticket data object.

In some embodiments, when causing rendering the incident and change management user interface, the at least one non-transitory memory and the program code are configured to, with the at least one processor, cause the apparatus to: generate the incident and change management user interface based at least in part on the at least one ticket time.

In accordance with various embodiments of the present disclosure, a computer-implemented method for generating an incident and change management user interface associated with an integrated service and asset management platform is provided. In some embodiments, the integrated service and asset management platform is associated with a plurality of service data objects and a plurality of ticket data objects. In some embodiments, the computer-implemented method comprises: receiving, from a client device, a ticket data object comprising an affected service data field indicating a service data object from the plurality of service data objects; in response to receiving the ticket data object, determining at least one related ticket data object from the plurality of ticket data objects; and cause rendering, on the client device, the incident and change management user interface based at least in part on the ticket data object, the service data object, and the at least one related ticket data object. In some embodiments, the ticket data object corresponds to at least one of an incident ticket data object or a change ticket data object. In some embodiments, the computer-implemented method further comprises: identifying at least one related service data object from the plurality of service data objects based at least in part on the affected service data field of the ticket data object, and selecting the at least one related ticket data object from the plurality of ticket data objects based at least in part on a corresponding affected service data field of each of the at least one related ticket data object indicating one of the service data object or the at least one related service data object.

In accordance with various embodiments of the present disclosure, a computer program product for generating an incident and change management user interface associated with an integrated service and asset management platform is provided. In some embodiments, the integrated service and asset management platform is associated with a plurality of service data objects and a plurality of ticket data objects. In some embodiments, the computer program product comprises at least one non-transitory computer-readable storage medium having computer-readable program code portions stored therein. In some embodiments, the computer-readable program code portions comprise an executable portion configured to: receive, from a client device, a ticket data object comprising an affected service data field indicating a service data object from the plurality of service data objects; in response to receiving the ticket data object, determine at least one related ticket data object from the plurality of ticket data objects; and cause rendering, on the client device, the incident and change management user interface based at least in part on the ticket data object, the service data object, and the at least one related ticket data object. In some embodiments, the ticket data object corresponds to at least one of an incident ticket data object or a change ticket data object. In some embodiments, the computer-readable program code portions comprise the executable portion configured to: identify at least one related service data object from the plurality of service data objects based at least in part on the affected service data field of the ticket data object, and select the at least one related ticket data object from the plurality of ticket data objects based at least in part on a corresponding affected service data field of each of the at least one related ticket data object indicating one of the service data object or the at least one related service data object.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
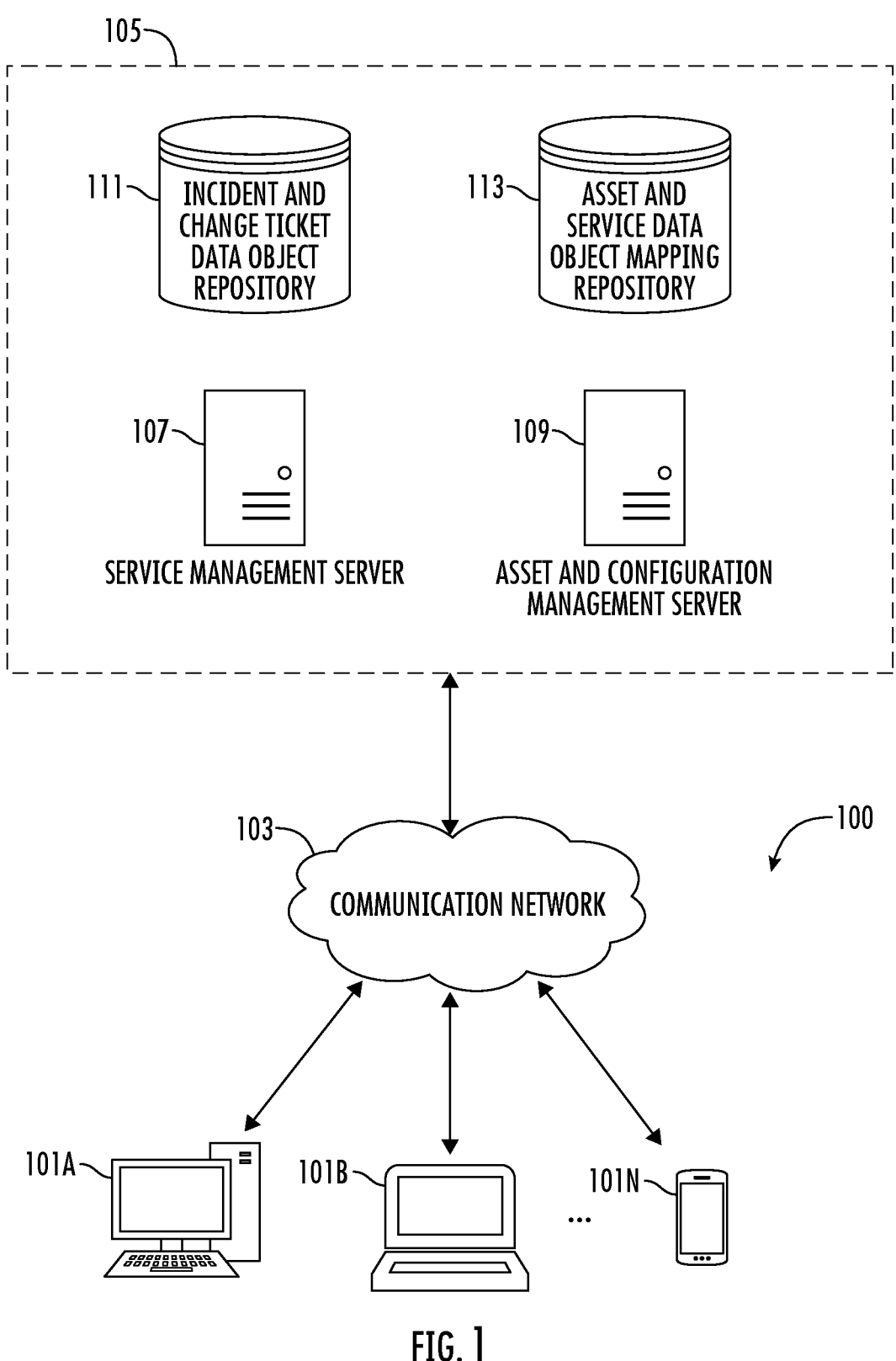
Figure 2:
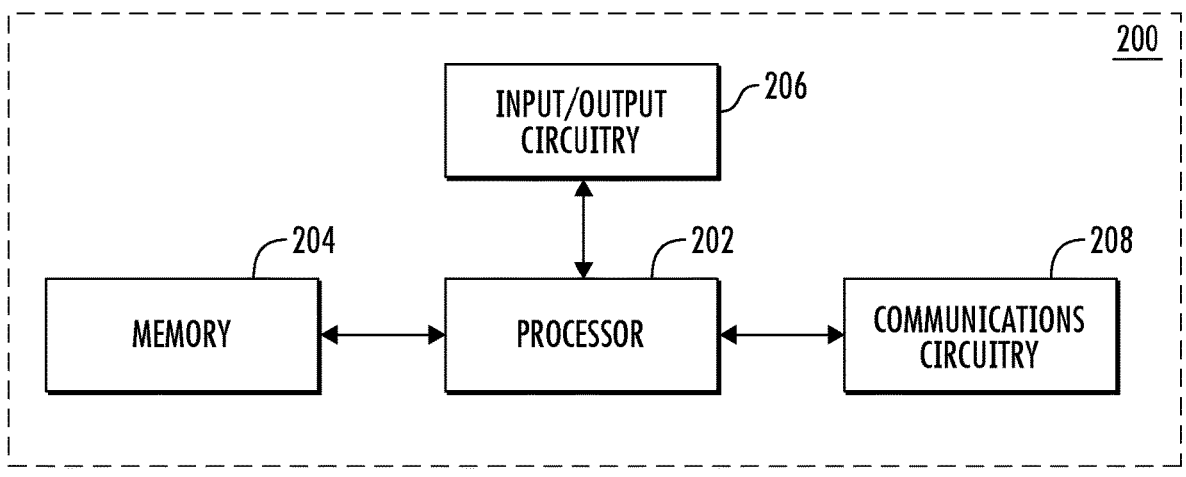
Figure 3:
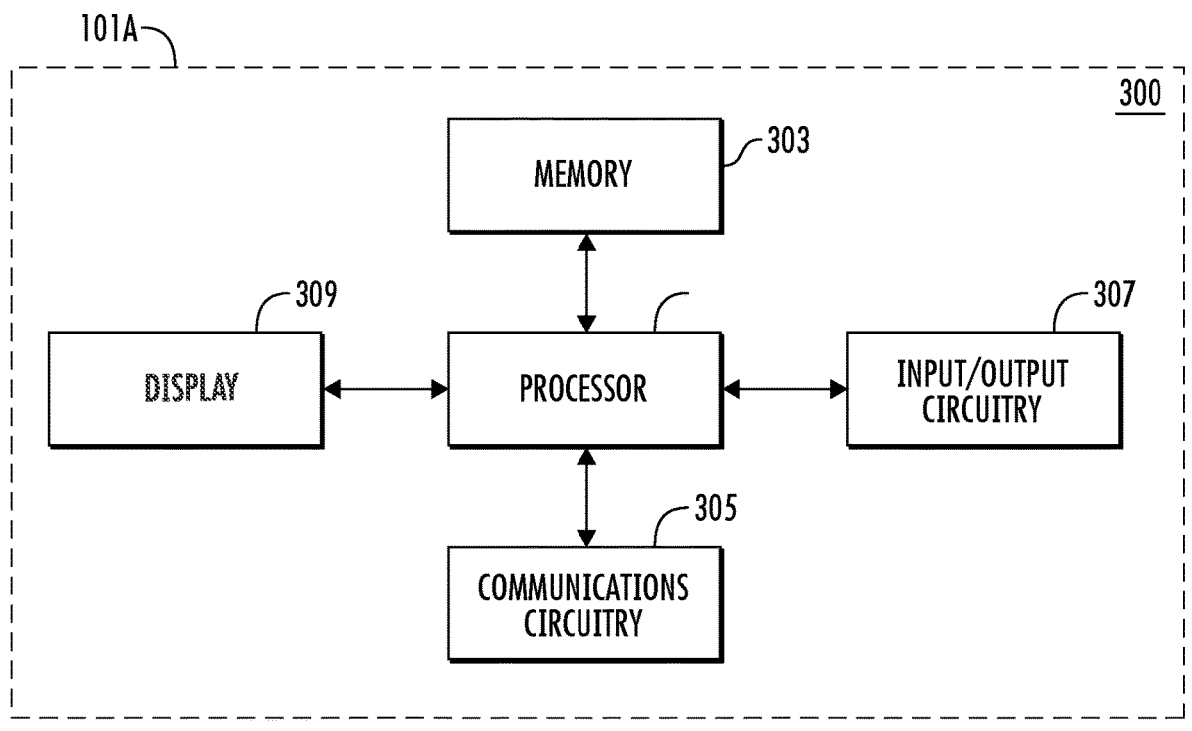
Figure 4:
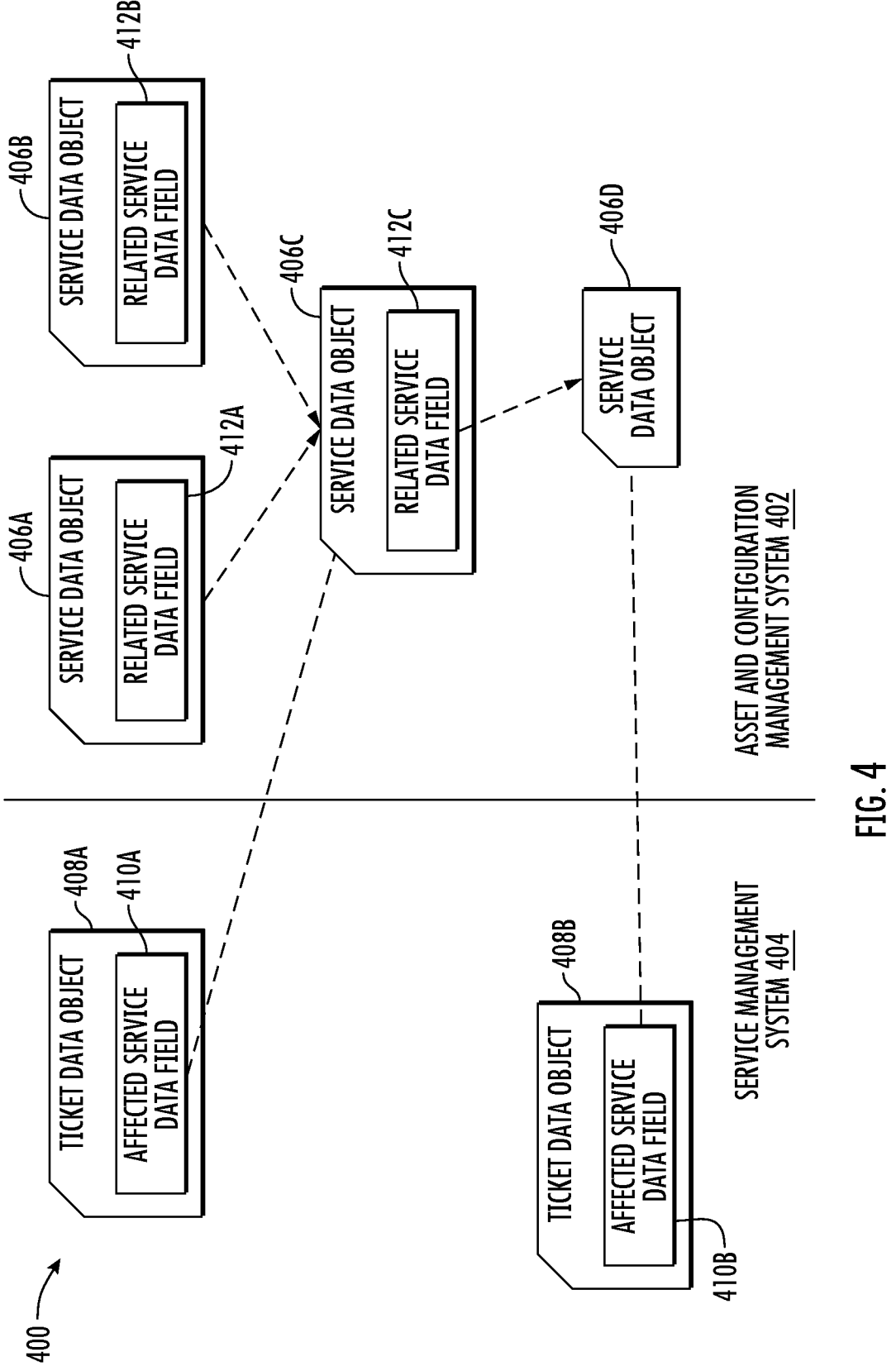
Figure 5:
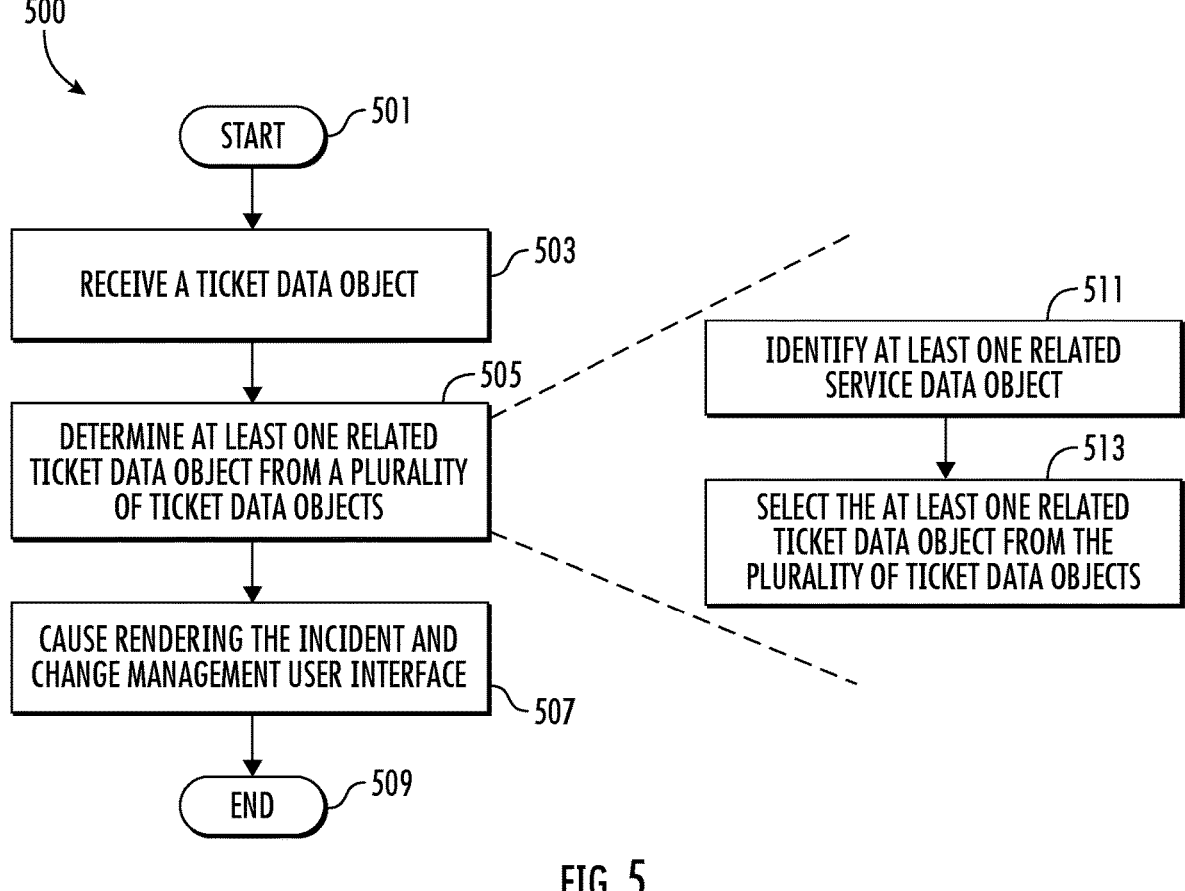
Figure 6:
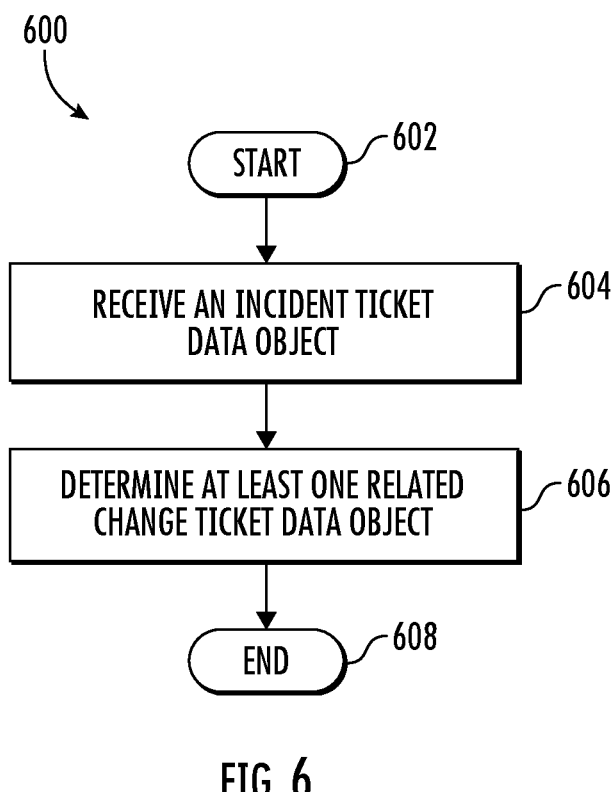
Figure 7:
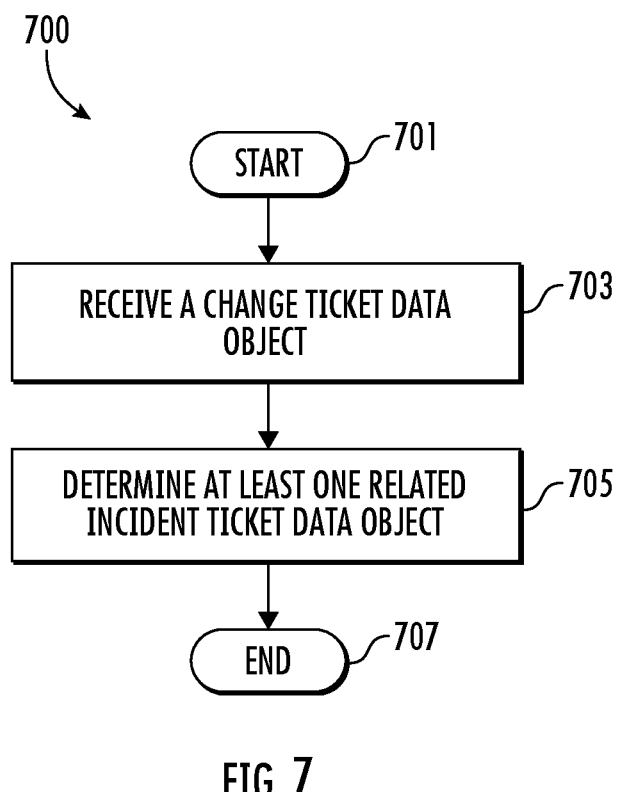
Figure 8:
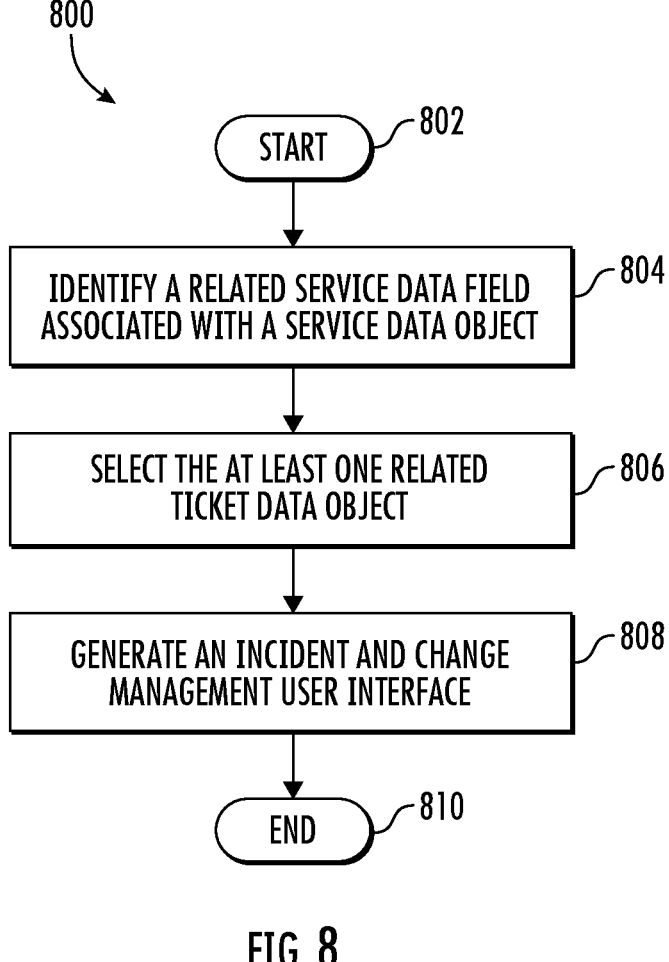
Figure 9:
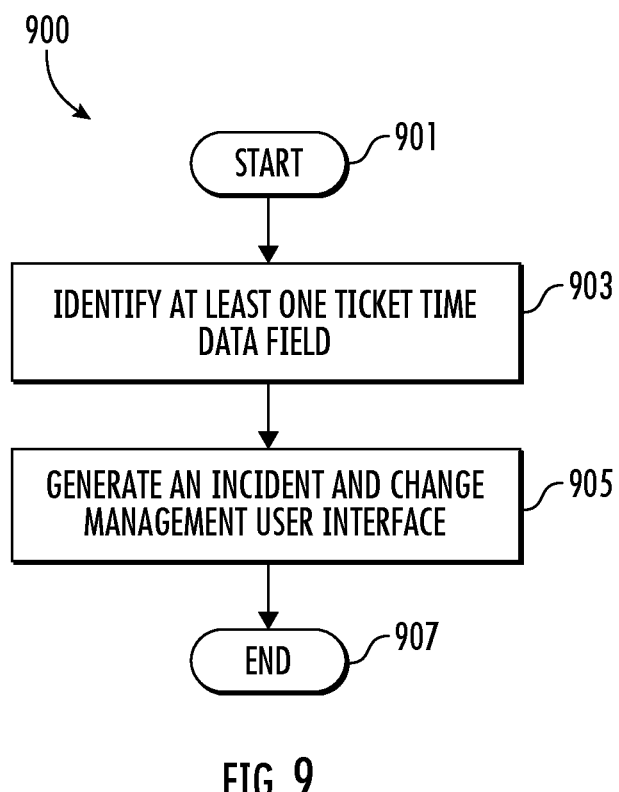
Figure 10:
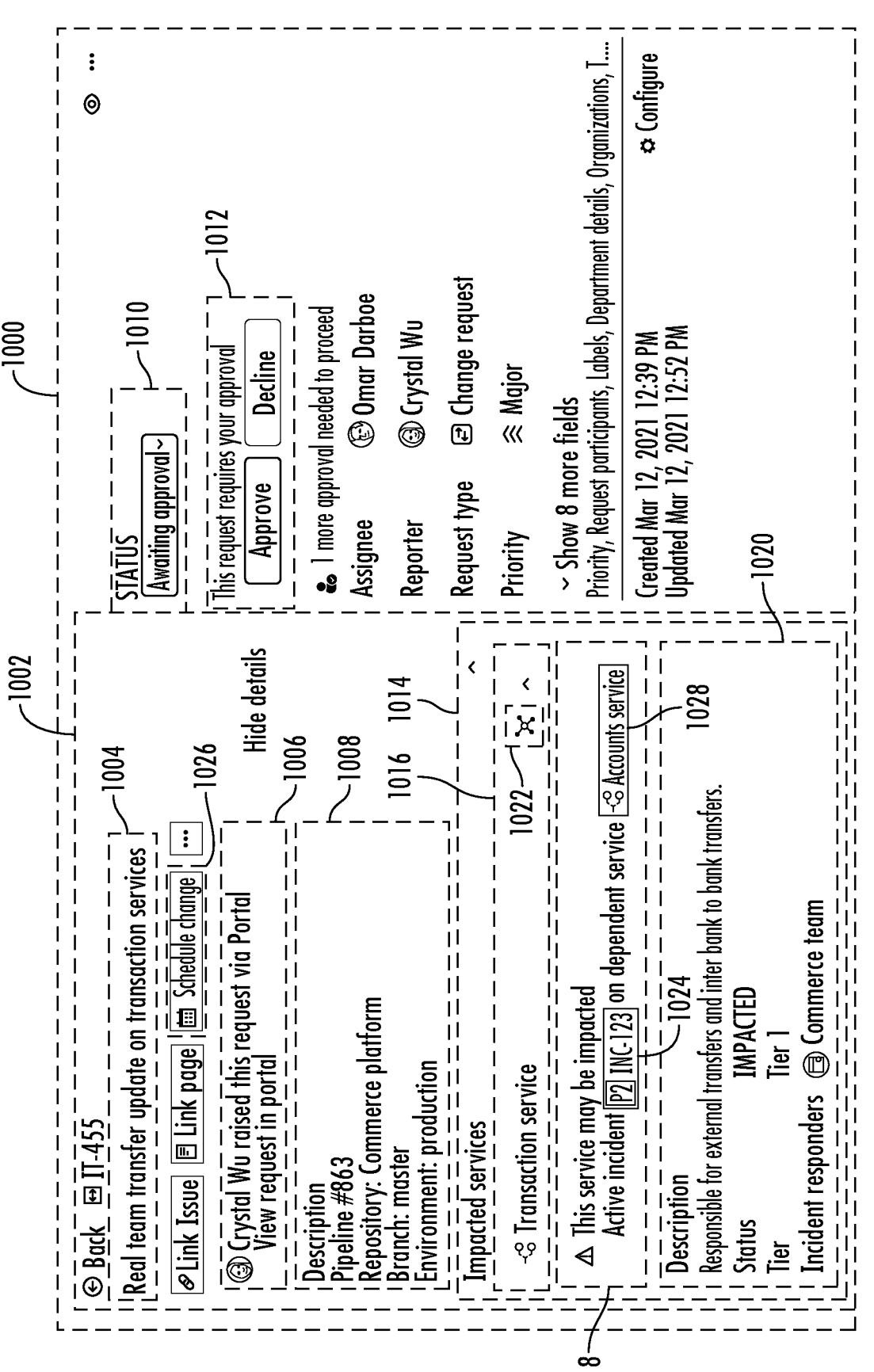
Figure 11:
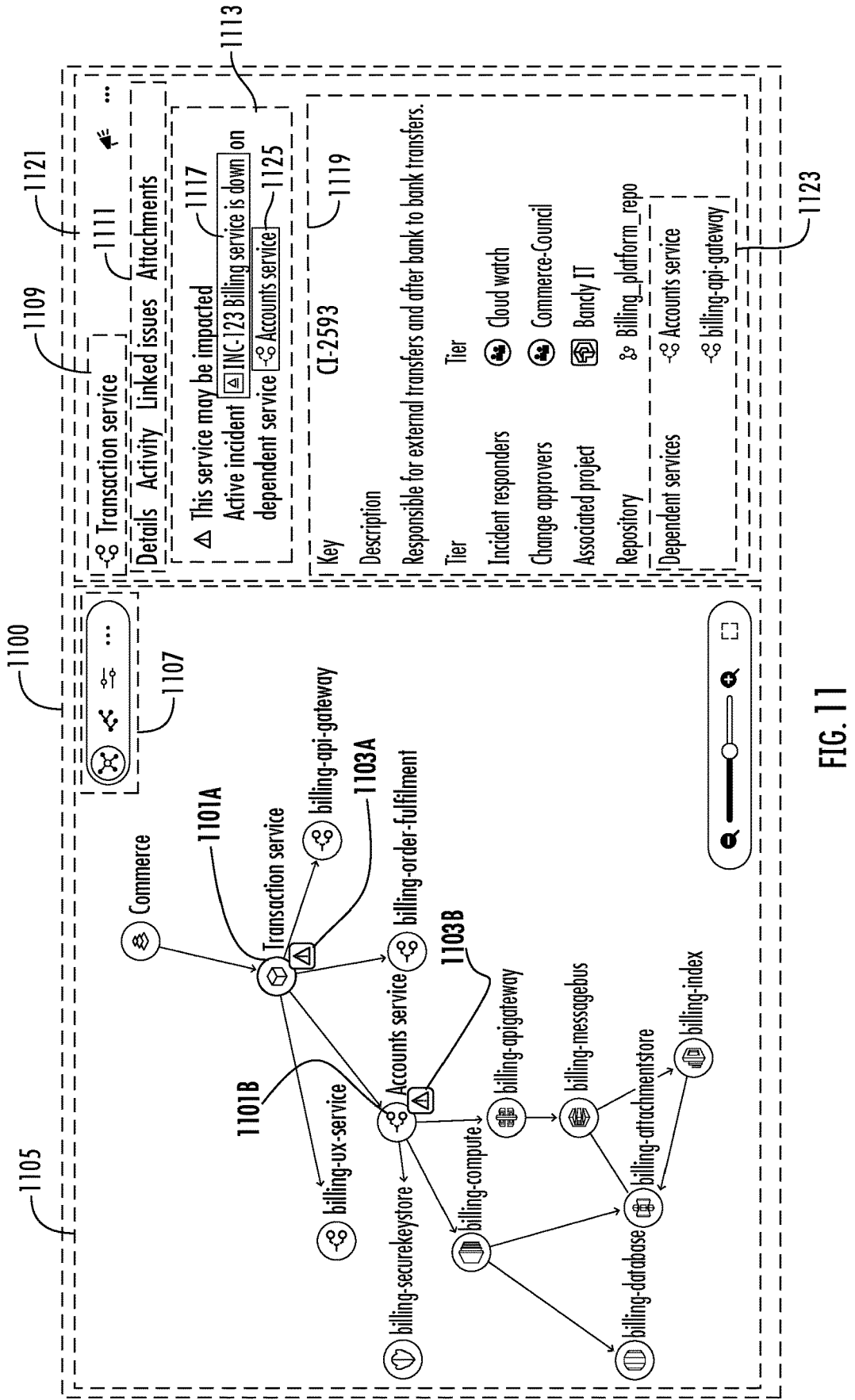
Figure 12:
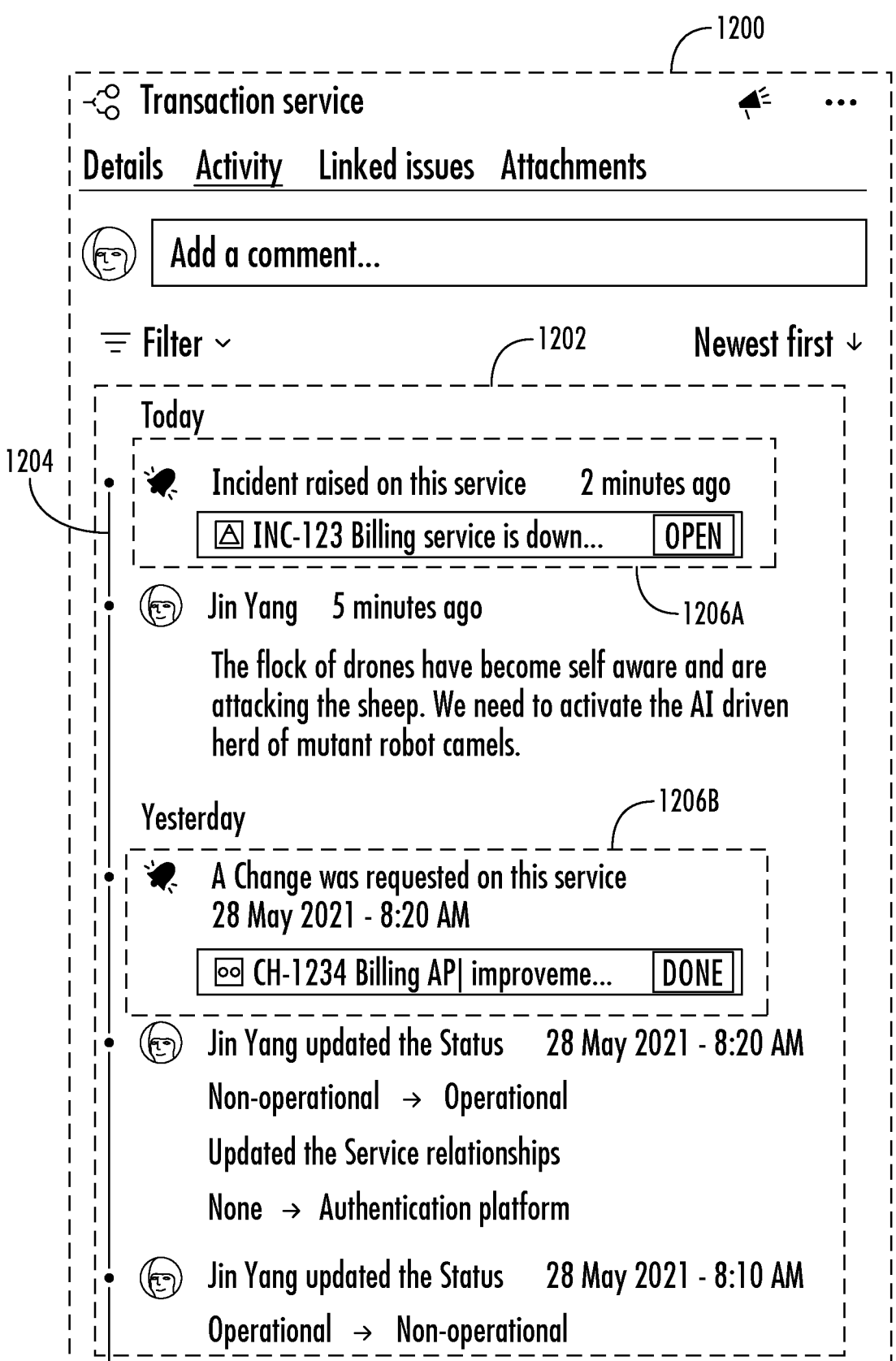

Having thus described some embodiments in general terms, references will now be made to the accompanying drawings, which are not necessarily drawn to scale, and wherein:

FIG. 1 is an example system architecture diagram illustrating an example integrated service and asset management platform in communication with other devices (such as client devices) in accordance with some embodiments of the present disclosure;

FIG. 2 is an example infrastructure diagram illustrating an example computing device (for example, an example server in the integrated service and asset management platform) in accordance with some embodiments of the present disclosure;

FIG. 3 is an example infrastructure diagram illustrating an example computing device (for example, an example client device) in accordance with some embodiments of the present disclosure;

FIG. 4 is an example block diagram illustrating example data associations between example service data objects and example ticket data objects in accordance with some embodiments of the present disclosure;

FIG. 5 is an example flowchart illustrating an example method in accordance with some embodiments of the present disclosure;

FIG. 6 is an example flowchart illustrating an example method in accordance with some embodiments of the present disclosure;

FIG. 7 is an example flowchart illustrating an example method in accordance with some embodiments of the present disclosure;

FIG. 8 is an example flowchart illustrating an example method in accordance with some embodiments of the present disclosure;

FIG. 9 is an example flowchart illustrating an example method in accordance with some embodiments of the present disclosure;

FIG. 10 illustrates at least a portion of an example incident and change management user interface in accordance with some embodiments of the present disclosure;

FIG. 11 illustrates at least a portion of an example incident and change management user interface in accordance with some embodiments of the present disclosure;

FIG. 12 illustrates at least a portion of an example incident and change management user interface in accordance with some embodiments of the present disclosure; and FIG. 13 illustrates at least a portion of an example incident and change management user interface in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements.

The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to generating and updating an incident and change management user interface for an integrated service and asset management platform. More specifically, various embodiments of the present disclosure are related to determining and selecting related data objects (such as, but not limited to, related service data objects and related ticket data objects) that are associated with a ticket data object received by the integrated service and asset management platform, and generating and/or updating an incident and change management user interface based at least in part on the related data objects.

In the present disclosure, the term "integrated service and asset management platform" refers to a software application platform and associated hardware components that offer information technology (IT) service management. In some embodiments, an example integrated service and asset management platform may enable end-to-end delivery and management of services and assets to customers (such as, but not limited to, an organization). For example, an example integrated service and asset management platform may provide functionalities that enable users from the organization to record, track, monitor, and/or manage incidents and changes associated with services and assets in the organization.

In the present disclosure, the term "service incident" refers to an unplanned event that causes a disruption to and/or a reduction in the quality of the service (or threatens to do so) within, associated with and/or provided by an organization. In the present disclosure, the term "incident management" refers to the process that ensures that standardized methods and procedures are used for effective, efficient and prompt handling of all incidents, in order to minimize any adverse impact of any incidents on services and business operation of the organization and resolve the incident as quickly as possible.

In some embodiments, an example service incident may be caused by one or more assets of services and/or within an organization (such as, but not limited to, servers, printers, computers, routers, and/or the like) ceasing to function properly. Additionally, or alternatively, an example service incident may be caused by one or more software provided by and/or associated with the services and/or installed on computers, workstations, and/or the servers of the organization (such as, but not limited to, an application software, firmware, and/or the like) ceasing to function properly. Additionally, or alternatively, an example service incident may be caused by a network failure associated with services and/or within the organization. Additionally, or alternatively, an example service incident may be caused by other factors. In some examples, incidents may be intangible events that happen to people or companies and result in an investigation launched to resolve the matter and find a root cause, such as, but not limited to, human resource (HR) incident, public relations (PR) incident, security breach incident etc. Examples of service incidents may include, but not limited to, a user's laptop being physically damaged, a software application failing to initiate, a server being non-responsive to requests (e.g. the server being down), and/or the like.

In some embodiments, the integrated service and asset management platform may record, track, monitor, and/or manage service incidents associated with services that are within, associated with, and/or provided by an organization.

In some embodiments, incident management encompasses different categories of users and personas within or outside the organization who utilize the integrated service and asset management platform to serve different roles and/or handle different aspects in recording, tracking, monitoring, and/or managing service incidents.

For example, an example user associated with the integrated service and asset management platform (for example, who utilizes the integrated service and asset management platform as a part of the incident management process) may be an "incident manager."

In some embodiments, incident managers are users who are within the organization and responsible for driving an incident to its resolution as quickly as possible. In some embodiments, incident managers may also be service owners who create, design, and/or control services within, associated with, and/or provided by an organization. In some embodiments, incident managers are responsible for documenting the timeline for the incident, conducting the root cause analysis of the service incident, and preparing post incident report (PIR) associated with the service incident. In some embodiments, incident managers may need to move between incidents and changes (as described herein) to roll-back deployments of changes as part of their process to resolve incidents.

Additionally, or alternatively, an example user associated with the integrated service and asset management platform (for example, who utilizes the integrated service and asset management platform as a part of the incident management process) may be a "first level support" (also referred to as a "tier 1 support").

In some embodiments, a first level support is a user who is within or outside the organization and who manages one or more support desks. In some embodiments, a first level support may generally triage and escalate support requests into incident ticket data objects (such as incident tickets). For example, when a user within an organization accidently damages his or her laptop, and the user may create an incident notification to the first level support reporting the accident and requesting a new laptop. In this example, the first level support may create an incident ticket data object that describes this incident in the integrated service and asset management platform. Additionally, or alternatively, when a user accessing a service provided by the organization (such as, but not limited to, the accounts service) notices that the service stopped responding, the user may report the incident to the first level support, and the first level support may create an incident ticket data object describing this incident. In some embodiments, the responsibilities of a first level support may include, but not limited to, understanding how, when, and who to escalate an incident ticket data object so that the right incident investigation teams, service owners, and/or incident managers can be notified.

Additionally, or alternatively, an example user associated with the integrated service and asset management platform (for example, who utilizes the integrated service and asset management platform as a part of the incident management process) may be an "incident stakeholder." In particular, different organizations may have different levels of maturity of incident response teams. While some example organizations may have a dedicated incident response team with a large number of people on the team, some example organizations may not have a dedicated incident response team. Based on the levels of maturity of incident response teams and the severity of incidents, incident stakeholders are the users who are key stakeholders within the organization that need to be kept in the loop on the progress of incidents. For example, some stakeholders (such as, but not limited to, PR personnel, executive team, and/or the like) may have responsibilities to provide status updates to the public on impacts caused by service incidents. In such an example, these stakeholders may need to engage with the incident manager throughout the incident timeline.

In the present disclosure, the term "service change" refers to addition, modification, or removal of anything (for example, software component, hardware component, and/or the like) that could have an effect or impact on IT services within, associated with and/or provided by an organization. In the present disclosure, the term "service management" refers to the process that ensures that standardized methods and procedures are used for effective, efficient and prompt handling of all changes, in order to minimize any adverse impact of any changes on IT services and business operation of the organization.

In some embodiments, an example service change may be in the form of a software update to one or more software installed on computers and/or servers within and/or otherwise be associated with the organization. Additionally, or alternatively, an example service change may be in the form of an installation or an uninstallation of one or more software that are installed on the computers and/or servers within and/or otherwise associated with the organization. Additionally, or alternatively, an example service change may be an addition or a removal of one or more assets (such as, but not limited to, computers, servers, and/or the like). Additionally, or alternatively, an example service change may be a modification of network settings and/or configurations associated with the organization. Additionally, or alternatively, an example service change may be in other forms.

In some embodiments, the integrated service and asset management platform may record, track, monitor, and/or manage service changes associated with services that are within, associated with, and/or provided by an organization. In some embodiments, the change management encompasses different categories of users and personas within or outside the organization who utilize the integrated service and asset management platform to serve different roles and/or handle different aspects in recording, tracking, monitoring, and/or managing changes.

For example, an example user associated with the integrated service and asset management platform (for example, who utilizes the integrated service and asset management platform as a part of the change management process) may be a "change manager."

In some embodiments, change managers are users who are within the organization and responsible for driving the management of the change request process in an organization/team (including all the automations). For example, change managers may be responsible for setting up the change request process and establishing procedures for effective, efficient and prompt handling of changes. In some embodiments, the change managers may be responsible for selecting the right change approvers. In some embodiments, change managers may be responsible for ensuring that the organization captures and reviews high-risk changes before such changes going out to production and being implemented, and without slowing down the entire pipeline for implementing changes. In some embodiments, change managers may be responsible for managing the change schedule within an organization so that service downtime and overlap risks can be appropriately planned.

Additionally, or alternatively, an example user associated with the integrated service and asset management platform (for example, who utilizes the integrated service and asset management platform as a part of the change management process) may be a "change approver" or be a part of a change approval board (CAB).

In some embodiments, the change approvers or the CAB are people responsible for reviewing and approving the requested changes. In some embodiments, change approvers may only focus on high-risk changes, and may need to perform risk analysis on these changes by examining the impact of the change and the reliability of services that the change(s) are being done on. In some embodiments, change approvers may need to understand the dependencies of the affected services and the history of incidents on these services so that they can make proper decisions on whether to approve or deny changes.

There are many technical challenges and difficulties associated with incident management solutions and change management solutions.

For example, many solutions provide separate platforms for incident management and for change management, therefore isolating incident management from change management in the organization. Such solutions may, for example, provide one software application for incident management in the organization and another software application for change management in the organization.

The isolation between incident management and change management can create many technical challenges and difficulties. Incident management and change management are very closely related to each other, with research showing that 80% of software-related incidents are caused by changes. By separating incidents from changes, such solutions fail to provide users (such as incident managers) a complete context of the incident, and may cause significant delays in resolving the incident and prolonged down time of the service. For example, without information on changes associated with related services, an incident manager may not be able to identify the root cause of such an incident, let alone resolving the incident. By separating changes from incidents, such solutions fail to provide users (such as change approvers) a complete context of the change, and may cause significant delays in approving changes and technical risks in the organization. For example, without information on incidents associated with related services, a change approver may not be able to conduct a proper risk analysis of the change, and/or may approve a change that can impose security and/or compatibility issues in services within the organization or can cause an incident in the service.

Additionally, many services have dependency relationships with one or more other services. For example, a transaction service may include software applications (and, in some embodiments, hardware components) that are responsible for external transfers and inter bank-to-bank transfers. An accounts service may include software applications (and, in some embodiments, hardware components) that enable users to manage their bank accounts. In such an example, the accounts service is a child service (e.g. a downstream service) of the transaction service as information related to the users' transfers are needed for maintaining user accounts.

Additionally, a change manager may want to assess the risk of making a change and so they would want to avoid releasing software changes that overlap with other releases (i.e. having too many changes released at once) or avoid releasing during a change freeze window (i.e. during Christmas holiday period).

Many incident management solutions and many change management solutions fail to incorporate dependency relationships, and can create security and/or compatibility issues on services. For example, when a change approver reviews changes associated with the transaction service, the change approver may approve the change while not being aware that there is an incident on the accounts service, and the change may worsen the incident on the accounts service and further prolong the downtime of the accounts service. As another example, when an incident manager attempts to resolve an incident on the accounts service, the incident manager may not be aware that there is a change on the transaction service that likely caused the incident (as accounts service receives information from transaction service), and may not be able to resolve the incident.

Additionally, many incident management solutions and many change management solutions segregate service management from incident management and/or change management, and may cause asynchronization between the services tracked in the service management solutions and services tracked in the incident management and/or change management. For example, many solutions may implement one management system for services and another management system for incident or change. When a user primarily engages with one of the management solutions (for example, a system that provides service management solutions), the user may report incidents and/or request changes. However, the segregation between service management and incident/change management can cause the incidents/changes recorded in one system not being reflected into the other system.

Additionally, solutions that do not implement examples of the present disclosure are faced with technical issues such as unnecessary computing resource consumption (for example, an increase in processor workload and storage space) and processing latency. As described above, such solutions may provide one software application for incident management in the organization and another software application for change management in the organization. If a change approver wants to review incidents associated with a service, or if an incident manager wants to review changes associated with a service, two separated software applications need to be operating at the same time, thereby increasing computing resource consumption and processing latency.

In contrast, various embodiments of the present disclosure overcome the above technical challenges and difficulties, and provide various technical benefits and advancements.

For example, various embodiments of the present disclosure provide an integrated asset and service management platform that supports incident and change management functionalities. Various embodiments of the present disclosure also provide an integrated incident and change management user interface that provides an intuitive way for a change approver to review incidents in related services and for an incident manager to review changes in related services.

For example, various embodiments of the present disclosure may generate, monitor, and store incident ticket data objects based on information associated with incidents, and may generate, monitor, and store change ticket data objects based on information associated with changes. For example, an example change ticket user interface pane 1002 that is generated based at least in part on a change ticket data object is illustrated and described in connection with FIG. 10.

In some embodiments, both incident ticket data objects and change ticket data objects are structured so that they comprise affected service data fields. For example, an affected service data field of an incident ticket data object may indicate one or more services that are affected by the incident corresponding to the incident ticket data object. As another example, an affected service data field of a change ticket data object may indicate one or more services that are affected by the change corresponding to the change ticket data object. For example, FIG. 10 illustrates an example change ticket user interface pane 1002 that is generated based at least in part on a change ticket data object. In the example shown in FIG. 10, the example change ticket user interface pane 1002 comprises an affected service user interface element 1016 that is generated based at least in part on the affected service data field of the change ticket data object.

As such, based at least in part on these affected service data fields, various embodiments of the present disclosure may connect incident ticket data objects and change ticket data objects to their respective service data objects. Various embodiments of the present disclosure may also provide an incident and change management user interface that illustrates the connections between incident ticket data objects and change ticket data objects to their respective service data objects.

For example, when an incident manager is reviewing an incident notification via the incident and change management user interface, the incident and change management user interface may display user interface elements showing changes in related services to assist the incident manager in conducting the root cause analysis of the incident. Additionally, or alternatively, when a change approver is reviewing a change request via the incident and change management user interface, the incident and change management user interface may display information related to incidents in related services to assist the change approver in conducting the risk analysis on the change.

Additionally, in some embodiments, the integrated service and asset management platform may determine service dependency relationships among different services, and the incident and change management user interface may illustrate other services that a service is related to (for example, downstream/child services and upstream/parent services).

For example, when an incident manager is reviewing an incident notification associated with a service via the incident and change management user interface, the incident and change management user interface may display information related to other services on which the service depends to assist the incident manager in conducting the root cause analysis of the incident. Additionally, or alternatively, when a change approver is reviewing a change request via the incident and change management user interface, the incident and change management user interface may display information related to other services that depend on the service to assist the change approver in conducting the risk analysis on the change.

As an example, users may want to assess the risk of making a change. Various embodiments of the present disclosure provide a dependency mapping interface (for example, a related service and incident mapping user interface 1105 as shown in FIG. 11) that allows users to be able to see any dependent services that may be affected by changes (which could constitute a risk). In some embodiments, users would also see the associated change calendar for an organization to ensure freeze windows are avoided.

Additionally, in some embodiments, when the integrated service and asset management platform receives a ticket data object, the integrated service and asset management platform programmatically identifies the corresponding service data object from the asset and configuration management system, and determines one or more related service data objects that are associated with the corresponding service data object. In some embodiments, the integrated service and asset management platform programmatically identifies one or more incident ticket data objects and/or change ticket data objects that are related to the corresponding service data object and/or the one or more related service data objects in the service management system, details of which are described herein.

As such, various embodiments of the present disclosure overcome technical challenges and difficulties associated with incident management and change management in complex network systems, and provide various technical benefits and advantages.

For example, by understanding the types and order of events that happen on a service over time, various embodiments of the present disclosure can provide critical information for the efficient resolution of incidents and change requests. By illustrating types of changes that occur on a service in the lead up to an incident on the incident and change management user interface, various embodiments of the present disclosure facilitate root case analysis of the incident. As another example, by illustrating information associated with current and past incidents to a service and its parent/child objects in the incident and change management user interface, various embodiments of the present disclosure can assist a change manager in conducting risk assessment on the change.

Additionally, by providing incident ticket data objects and change ticket data objects with default affected service fields, various embodiments of the present disclosure can proactively connect incident ticket data objects and change ticket data objects to service data objects. The affected service field is a unique system field that allows the integrated service and asset management platform to determine when changes are actually happening to a service, and the integrated service and asset management platform can also determine whether the service itself is connected to any incident or code release based on the affected service fields. As such, various embodiments of the present disclosure can proactively and accurately determine the relationships between incidents and changes. By facilitating these information and proactively making the connections, various embodiments of the present disclosure can serve these insights for users to do their work quicker and with less effort.

As an example, a change ticket data object may represent a service change request (for example, CHA123), and the affected service data field of the change ticket data object may indicate that the service change request (such as, but not limited to, CHA123) affects transaction service (for example, represented by a service data object). An incident ticket data object may represent a service incident notification (for example, INC123), and the affected service data field of the incident ticket data object may indicate that the service incident notification (such as, but not limited to, INC123) also affects transaction service (for example, represented by the service data object). Various example embodiments of the present disclosure connect both the change ticket data object that represents CHA123 and the incident ticket data object that represents INC123 to the service data object that represents transaction service. Various embodiments of the present disclosure may generate an incident and change management user interface that connects a change ticket user interface icon based on the change ticket data object, as well as an incident ticket user interface icon based on incident ticket data object, to a service user interface icon based on the service data object. In other words, by connecting both INC123 and CHA123 to transaction service, various embodiments of the present disclosure can display "related" changes to incidents and vice versa "related incidents" to changes. "Related" in the example of viewing an incident means that various embodiments of the present disclosure can show recent changes performed on the service(s) affected by that incident (including changes on the child services). And in the example of viewing a change, "related" means that various embodiments of the present disclosure can show current and past incidents on the service(s) affected by that change (including incidents on the child services).

As such, various embodiments of the present disclosure allow an organization to connect all things, objects, and/or assets in their organization to the work that people do on those things, objects, and/or assets. In some embodiments, work can be captured by issues with a workflow that has a finite end. In some embodiments, things can be captured by the objects/assets and can exist indefinitely. In some embodiments, the connection of "things" to "work" can be critical in helping to unleash the potential of all teams and in making them much more efficient by unlocking smart proactive features. For example, various embodiments of the present invention can facilitate both incident and change management by connecting them both to services and assets, streamlining both types of work. By knowing this context of connection/mapping of things, various embodiments of the present disclosure can proactively serve up smart recommendations to save users a lot of time. And by connecting the automation platform to an integrated service and asset management platform in accordance with various embodiments of the present disclosure, users are able to further streamline workflows.

Additionally, many configuration management databases (CMDBs) require lots of effort to keep the data "fresh" and up to date. This effort becomes unmanageable in some cases where the CMDB is completely disconnected from its data source (for example, if data sits behind a firewall or if the data is being kept in a cloud app (e.g. AWS or Google cloud or some other asset management system)). The asset and configuration management system in accordance with various examples of the present disclosure tackles this problem by aggregating the data into one single place whilst still syncing to the original source to keep the data up to date (i.e. fresh). Various embodiments of the present disclosure overcome these challenges through the use of strategic cloud app integrations, data import/sync mechanisms such as the "discovery" app and through application programming interfaces (APIs).

In addition, an example of CMDB in accordance with various embodiments of the present disclosure allows organizations to connect all the things/objects/assets in their company to the work that people do on those things. Work being captured by issues with a workflow and having a finite end. Things being captured by the objects/assets and living indefinitely. This connection of "things" to "work" is critical in helping to unleash the potential of all teams and in making them much more efficient by unlocking smart proactive features.

While the description above provides some example technical benefits and advantages provided by various example embodiments of the present disclosure, it is noted that technical benefits and advantages provided by example embodiments of the present disclosure are not limited to the examples described above.

For example, some embodiments of the present disclosure overcome technical challenges and difficulties associated with maintaining data and/or information stored across different computing systems and/or data storages. As an example, some embodiments of the present disclosure may generate and maintain a persistent identifier for each asset and each service that are stored in one or more other systems/data storages, and may provide configured data relationships between such other systems/data storages and the system that generates incident and change management user interfaces (even if these systems/data storages have different, independent life cycles).

Additionally, or alternatively, some embodiments of the present disclosure maintain the "graph" state that represents data relationships such as, but not limited to, asset/service dependencies and relationships, which are necessary for rendering interactive incident and change management user interfaces.

Additionally, or alternatively, some embodiments of the present disclosure enable the configurations of incident and change management user interfaces to restrict one or more sets of services and/or assets to the right ones based on the user context. As described in details herein, various embodiments of the present disclosure provide data fields such as, but not limited to, affected service data field, affected asset data field, and/or the like. As an example, an IT team X that manages change for data center Y in JSM project Z may configure the affected asset field to only be able to include assets that are relevant to their team.

Additionally, or alternatively, some embodiments of the present disclosure integrate incident management and change management in the same software system with connectivity to the same graphs of service/asset data and their dependencies, even though incidents are not the same as changes due to difference in their life cycles, workflows, etc. For example, the incident and change management user interfaces rendered in accordance with various embodiments of the present disclosure illustrate dependencies associated with services and/or assets, allowing change managers to assess risks of making changes.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the term "set" or "subset" refers to a collection of zero or more elements.

In the present disclosure, the term "data object" refers to a data structure that represents one or more features, attributes, functionalities and/or characteristics associated with data, information, physical objects, and/or the like. In some embodiments, a data object may be associated with one or more software (for example, one or more computer programs) and/or one or more hardware (for example, one or more servers and/or one or more client devices).

In some embodiments, data items in an example data object may include one or more data fields. The term "data field" refers to a parameter, metadata, a data element, or the like that describes an attribute or a characteristic of a data object, and/or an attribute or a characteristic of the data and/or information that the data object represents.

In various embodiments of the present disclosure, various data objects can be categorized based on the data and/or information that the data objects comprise and/or represent. In various embodiments of the present disclosure, "data objects" can be categorized by creating "object types," which defines a set of attributes (such as, but not limited to, data fields) that objects created under that type will use. For example, example categories of data objects may include, but not limited to, service data objects, asset data objects, ticket data objects, and/or the like.

Object type is also important in determining the suitability for an object to be used by the "affected service data field" to drive specific incident management and change management functionality. In some embodiments, when an incident management team configures an "on call roster" for incident managers to respond to incidents, they need to track all the services they will look after and they will need to be able to assign an owner/team to each of those services to act as the "first responder" to an incident for that service. As such, for an object type such as "services" to be suitable to have incidents raised on it, it would need to have an attribute/field for "responder/owner." Without this attribute, the service object type is incapable of supporting incident management capabilities effectively.

As described further below, the affected service data field only allows users to select service object types (for example, service data objects), as the service object types are system-defined and they guarantee all the necessary attributes/fields to be included. While users may create custom object types, custom object types created by users are generic object types, which means the system cannot guarantee that the necessary attributes/fields will be present, and hence the affected service data fields may not be implemented in such custom object types in some embodiments of the present disclosure.

In the present disclosure, the term "service data object" refers to a type of data object that represents features, attributes, functionalities and/or characteristics associated with and/or related to a software-based service. Examples of the software-based service may include, but not limited to, software-based sales services, software-based customer relationships management services, software-based human collaboration services, and/or the like. For example, a service data object may represent a transaction service that is responsible for external transfers and inter bank-to-bank transfers. As another example, a service data object may represent an accounts service that is responsible for managing a user's bank accounts.

In some embodiments, a service data object comprises one or more data fields. For example, an example service data object may comprise a "related service data field." In the present disclosure, the term "related service data field" refers to a data field of a service data object that indicates one or more other service data objects upon which the service data object depends (e.g. parent service data objects) and/or indicates one or more other service data objects that depend on the service data object (e.g. child service data objects). For example, a service data object A may comprise a related service data field indicating that the service data object A is dependent upon a service data object B, which means that service data object A requires data and/or information from service data object B to perform the functions of software-based services represented by the service data object A. Continuing from the example described above, the service data object that represents the accounts service is dependent on the service data object that represents the transaction service. As another example, a service data object A may comprise a related service data field indicating that the service data object B is dependent upon the service data object A, which means that service data object B requires data and/or information from service data object A to perform the functions of software-based services as represented by the service data object B.

In the present disclosure, the terms "child service data object" or "downstream service data object" refer to a data object that depends upon another service data object. For example, if a service data object A depends on service data object B, then the service data object A is a child service data object or a downstream service data object of service data object B. Continuing from the example described above, the service data object that represents the accounts service is a child service data object for the service data object that represents the transaction service.

In the present disclosure, the terms "parent service data object" or "upstream service data object" refer to a data object upon which another service data object depends. For example, if a service data object A depends on service data object B, then the service data object B is a parent service data object or an upstream service data object of service data object A. Continuing from the example described above, the service data object that represents the transaction service is a parent service data object for the service data object that represents the accounts service.

In the present disclosure, the term "asset data object" refers to a type of data object that represents features, attributes, functionalities and/or characteristics associated with and/or related to a physical asset that is within or associated with an organization. For example, an example asset data object may represent a computer, a server, a laptop, a desktop, a mobile phone and/or the like.

In accordance with various embodiments of the present disclosure, an integrated service and asset management platform can be implemented to manage software-based services that are within, associated with, and/or provided by an organization. In the present disclosure, the term "integrated service and asset management platform" refers to a software system and associated hardware that allows users from an organization to manage incidents and changes associated with services and assets that are within, associated with, and/or provided by the organization and represented by service data objects and asset data objects. For example, the integrated service and asset management platform may provide software applications and associated hardware components that allow users from the organization to conduct change management and incident management. As described above, examples of users associated with the organization may include, but not limited to, incident managers, first level support, incident stakeholders, change managers, change approvers, and/or the like.

In some embodiments, an example integrated service and asset management platform in accordance with various embodiments of the present disclosure may comprise one or more sub-platforms, systems, and/or the like. For example, an example integrated service and asset management platform may comprise a service management system and an asset and configuration management system.

In the present disclosure, the term "asset and configuration management system" refers to a software system and associated hardware that allow users from an organization to manage services that are within, associated with, and/or provided by the organization and represented by service data objects. For example, the asset and configuration management system may store service data objects representing services that are within, associated with, and/or provided by the organization. Additionally, or alternatively, the asset and configuration management system may map each service data object to a corresponding service that is within, associated with, and/or provided by the organization. Additionally, or alternatively, the asset and configuration management system may define dependency relationships between service data objects. Additionally, or alternatively, the asset and configuration management system may store asset data objects representing assets that are within, associated with, and/or provided by the organization.

In the present disclosure, the term "service management system" refers to a software system and associated hardware that allows users from an organization to receive and record incidents and/or changes that are within and/or associated with the organization. For example, the service management system may provide a data object repository that stores incident ticket data objects and/or change ticket data objects.

In some embodiments, an example integrated service and asset management platform may receive, store, or otherwise be associated with ticket data objects. In the present disclosure, the term "ticket data object" refers to a type of data object that represents features, attributes, functionalities and/or characteristics associated with and/or related to a request associated with a software-based service (for example, as represented by a service data object) or an asset. For example, a user operating a client device may generate a ticket data object associated with a software-based service, and the ticket data object may indicate a request from the user and related to the software-based service.

In various embodiments of the present discourse, various ticket data objects can be categorized based on the data and/or information that the ticket data objects comprise and/or represent.

In some embodiments, an example ticket data object is a change ticket data object. In the present disclosure, the term "change ticket data object" refers to a type of ticket data object that represents a service change associated with a software-based service (for example, as represented by a service data object). As described above, the term "service change" refers to addition, modification, or removal of anything (for example, software component, hardware component, and/or the like) that could have an effect or impact on IT services within, associated with and/or provided by an organization.

For example, the change ticket data object may represent addition, modification, or removal of a software component that is related to software-based service. For example, an example change ticket data object may comprise information related to software updates to one or more software that are installed on computers and/or servers within and/or otherwise associated with the organization. Additionally, or alternatively, an example change ticket data object may comprise information associated with an installation or an uninstallation of one or more software that are installed on computers and/or servers within and/or otherwise associated with the organization. Additionally, or alternatively, an example change ticket data object may comprise information associated with a modification of network settings and/or configurations associated with the organization. Additionally, or alternatively, an example change ticket data object may comprise other information.

In the present disclosure, the term "service change request" refers to a user's request for a service change associated with a software-based service or an asset that is within or provided by the organization. For example, a user may generate a service change request using a client device. In some embodiments, the client device may generate a change ticket data object based on the service change request, and transmit the change ticket data object to the integrated service and asset management platform. Additionally, or alternatively, the client device may transmit the service change request to the integrated service and asset management platform, and the integrated service and asset management platform may generate a corresponding change ticket data object.

In some embodiments, an example ticket data object is an incident ticket data object. In the present disclosure, the term "incident ticket data object" refers to a type of ticket data object that represents a service incident associated with a software-based service (for example, as represented by a service data object). As described above, the term "service incident" refers to an unplanned event that causes a disruption to and/or a reduction in the quality of the IT service (or threatens to do so) within, associated with and/or provided by an organization.

For example, the incident ticket data object may comprise data and/or information associated with the event that causes a disruption to and/or a reduction in the quality of the software-based service. For example, an example incident ticket data object may comprise information indicating one or more assets for IT services and/or within an organization (such as, but not limited to, servers, printers, computers, routers, and/or the like) ceasing to function properly. Additionally, or alternatively, an example incident ticket data object may comprise information indicating one or more software of the organization (such as, but not limited to, an application software, firmware, and/or the like) ceasing to function properly. Additionally, or alternatively, an example incident ticket data object may comprise information indicating a network failure associated with the organization. Additionally, or alternatively, an example incident ticket data object may comprise information indicating a user's laptop being physically damaged, a software application failing to start, a server being non-responsive to requests (e.g. the server being down), and/or the like. Additionally, or alternatively, an example incident ticket data object may comprise other information.

In the present disclosure, the term "service incident notification" refers to an electronic notification that indicates the existence of a service incident, and/or may comprise data and/or information associated with the service incident. For example, a user may generate a service incident notification using a client device (for example, when the user notices a service incident). In some embodiments, the client device may generate an incident ticket data object based on the service incident notification, and transmit the incident ticket data object to the integrated service and asset management platform. Additionally, or alternatively, the client device may transmit the service incident notification to the integrated service and asset management platform, and the integrated service and asset management platform may generate a corresponding incident ticket data object. Additionally, or alternatively, one or more computing devices (such as, but not limited to, servers, computers, and/or the like) and networking devices (such as, but not limited to, routers) may generate a service incident notification (for example, in response to detecting a service incident), and may transmit the service incident notification to the integrated service and asset management platform.

In accordance with various embodiments of the present disclosure, an example ticket data object (for example, a change ticket data object or an incident ticket data object) may comprise one or more data fields. For example, an example ticket data object may comprise an affected service data field and/or an affected asset data field.

In the present disclosure, the term "affected service data field" refers to a data field associated with the ticket data object (for example, a change ticket data object or an incident ticket data object) that indicates one or more software-based services (for example, as represented by one or more service data objects) that are affected by the request represented by the ticket data object.

In some embodiments, the "affected service data field" is a system-defined field. In some embodiments, the affected service data field is needed to run both incident management practice and change management practice. In some embodiments, without the affected service data field, incident management and change management may provide much less value and are not able to talk to each other.

In some embodiments, only a single "affected service data field" exists per instance. In some embodiments, this system-defined field cannot be deleted and cannot be renamed so that various embodiments of the present disclosure can ensure accuracy when connecting services to incidents and changes through this field. This predictability allows various embodiments of the present disclosure to run critical incident management practice and change management practice off this field.

In the present disclosure, the term "affected asset data field" refers to a data field associated with the ticket data object (for example, a change ticket data object or an incident ticket data object) that indicates one or more assets (for example, as represented by one or more asset data objects) that are affected by the change request or incident notification represented by the ticket data object. In some embodiments, the affected asset data field allows users to raise incidents and changes on any object type (such as, but not limited to, servers, laptops, bridges, software application services, people, etc.)

Example affected service data fields and example affected asset data fields in accordance with various embodiments of the present disclosure may provide various technical benefits and advantages. For example, such data fields enable tagging and identifying all parts of an organization's system with accuracy so that changes can be efficiently tracked/managed and incident resolution can be quickly performed. In particular, the affected service data field is unique in that only one can exist in each ticket data object. Similarly, the affected asset data field is unique in that only one can exist in each ticket data object. In some embodiments, a user may only select certain objects and/or assets for such data fields, which have fixed attributes that are designed to facilitate and streamline incident management processes and change management processes. In some embodiments, the affected service data fields and the affected asset data fields are specifically designed for incident management and change management scenarios, and various example systems provide built-in features to leverage this data and streamline the incident management process and change management processes.

In some embodiments, the affected service data fields and the affected asset data fields cannot be duplicated with a standard "service custom field" or a standard "asset custom field," which are generic and customizable. In particular, service custom fields and asset custom fields are not guaranteed to provide the necessary attributes/data to be compatible with workflows for incident management processes and change management processes. In addition, there can be multiple service custom fields and/or multiple asset custom fields, resulting in no single source of truth for identifying the affected service or the affected asset. In contrast, various embodiments of the present disclosure provide change and incident management on just services by conforming different services to a type or specification that the incident management and change management solutions in accordance with various embodiments of the present disclosure can operate on. Similarly, various embodiments of the present disclosure conform all assets that can be affected to a standard interface. As an example, a user may perform incident and change management on different types of services and assets (such as, but not limited to, software services, firewalls, business services, servers and storage area network (SAN), and/or the like) that are all conform to a standard interface (for example, set of fields as described above) that is required for incident and change management to function. As such, various embodiments of the present disclosure enable any kind of service/asset to be compatible with incident management and change management systems, such that incident management and change management systems may utilize data associated with the service and assets.

In some embodiments, a change ticket data object may comprise an affected service data field that indicates one or more software-based services (for example, as represented by one or more service data objects) that are affected by the service change that is represented by the change ticket data object. In some embodiments, the affected service data field may be generated based at least in part on the service change request associated with the change ticket data object.

For example, an example change ticket data object may comprise information related to software update to one or more software that are installed on computers and/or servers within and/or otherwise associated with the organization. In such an example, the affected service data field of the example change ticket data object may indicate one or more software-based services (for example, as represented by one or more service data objects) that are affected by the software update.

Additionally, or alternatively, an example change ticket data object may comprise information associated with an installation or an uninstallation of one or more software that are installed on the computers and/or servers within and/or otherwise associated with the organization. In such an example, the affected service data field of the example change ticket data object may indicate one or more software-based services (for example, as represented by one or more service data objects) that are affected by the software installation or uninstallation.

Additionally, or alternatively, an example change ticket data object may comprise information associated with a modification of network settings and/or configurations associated with the organization. In such an example, the affected service data field of the example change ticket data object may indicate one or more software-based services (for example, as represented by one or more service data objects) that are affected by the modification of network settings and/or configurations associated with the organization.

In some embodiments, an incident ticket data object may comprise an affected service data field that indicates one or more software-based services (for example, as represented by one or more service data objects) that are affected by the service incident that is represented by the incident ticket data object. In some embodiments, the affected service data field may be generated based at least in part on the service incident notification associated with the incident ticket data object.

For example, an example incident ticket data object may comprise information indicating one or more software of the organization (such as, but not limited to, an application software, firmware, and/or the like) ceasing to function properly. In such an example, the affected service data field of the example incident ticket data object may indicate one or more software-based services (for example, as represented by one or more service data objects) that are affected by the one or more software of the organization ceasing to function properly.

Additionally, or alternatively, an example incident ticket data object may comprise information indicating a network failure associated with the organization. In such an example, the affected service data field of the example incident ticket data object may indicate one or more software-based services (for example, as represented by one or more service data objects) that are affected by the network failure associated with the organization.

While the description above provides examples of ticket data objects (e.g. incident ticket data objects and change ticket data objects), it is noted that the scope of the present disclosure is not limited to the examples above. In some examples, an example ticket data object may represent additional and/or alternative information that is related to ITSM. For example, an example ticket data object may be in the form of a problem ticket, a service request ticket, and/or the like.

In some embodiments, an example ticket data object may be in the form of an "open ticket data object." In the present disclosure, the term "open ticket data object" refers to a ticket data object that has been generated or received by the integrated service and asset management platform and represents a request that has not been addressed or resolved. For example, an example open ticket data object may describe a service change request associated with a service, and the service change request has not been reviewed or implemented. Additionally, or alternatively, an example open ticket may describe a service incident notification associated with a service, and the incident associated with the service incident notification has not been resolved.

In some embodiments, the integrated service and asset management platform may comprise a data object repository that stores open ticket data objects.

In some embodiments, an example open ticket data object is an open change ticket data object. In the present disclosure, the term "open change ticket data object" refers to a change ticket data object that has been generated or received by the integrated service and asset management platform and represents a service change request that has not been reviewed or implemented. For example, the integrated service and asset management platform may comprise a data object repository that stores open change ticket data objects.

In some embodiments, an example open ticket data object is an open incident ticket data object. In the present disclosure, the term "open incident ticket data object" refers to an incident ticket data object that has been generated or received by the integrated service and asset management platform and represents a service incident notification that has not been resolved. For example, the integrated service and asset management platform may comprise a data object repository that stores open incident ticket data objects.

In accordance with various embodiments of the present disclosure, an example ticket data object may be in the form of a closed ticket data object. In the present disclosure, the term "closed ticket data object" refers to a ticket data object that has been generated and/or received by the integrated service and asset management platform and represents a request that has been addressed or resolved. For example, an example closed ticket data object may be a closed change ticket data object that describes a service change request associated with a service, and the service change request has been reviewed or implemented. Additionally, or alternatively, an example closed ticket data object may be a closed incident ticket data object that describes a service incident notification associated with a service, and the incident associated with the service incident notification has been resolved. In some embodiments, the integrated service and asset management platform may comprise a data object repository that stores closed ticket data objects.

In some embodiments, understanding past incidents that have happened on services that a change will affect would be helpful in determining risk for approving or denying this change, as this historical information would provide users a good indication of the reliability of this service over time.

In some embodiments, the closed ticket data objects may be presented to users in various ways. For example, a user may view information associated with closed ticket data objects through an activity timeline user interface sub-pane (such as the activity timeline user interface sub-pane 1202 illustrated below in connection with FIG. 12). In some embodiments, the activity timeline user interface sub-pane shows what (if any) incidents have been raised on a service before. In such examples, users would have to do this for every service independently, which would take time and could be inefficient.

Additionally, or alternatively, various example embodiments of the present disclosure can provide such information through a related service and ticket sub-pane in the change ticket user interface pane that automatically pulls all closed incidents from the services listed in the affected service data field, and conveniently lists them in this sub-pane in chronological order and categorized based on services. Such an example sub-pane can save the user a lot of time looking for this information (which may not even exist).

In some embodiments, the change ticket user interface pane may display past or historical information that could be helpful for change management users in assessing risk by displaying how past changes to services listed in the affected services list have fared (for example, whether they had any issue or what has worked well that could be replicated).

In the present disclosure, the term "related ticket data object" refers to a ticket data object that is related to another ticket data object. In some embodiments, an example related ticket data object may be an open ticket data object. In some embodiments, an example related ticket data object may be a closed ticket data object.

For example, a related ticket data object may be a related change ticket data object that is a change ticket data object and related to another change ticket data object or an incident ticket data object. As another example, a related ticket data object may be a related incident ticket data object that is an incident ticket data object and related to another incident ticket data object or a change ticket data object.

In some embodiments, the integrated service and asset management platform may programmatically determine related ticket data objects based at least in part on the affected service data fields, details of which are described herein.

In the present disclosure, the term "ticket time data field" refers to a data field that indicates a ticket time corresponding to when a ticket data object was generated and/or when the request associated with the ticket data object was received. For example, an example ticket time data field associated with an open change ticket data object may indicate when the service change is requested. As another example, an example ticket time data field associated with an open incident ticket data object may indicate when the service incident occurs. As another example, an example ticket time data field associated with a closed change ticket data object may indicate when the service change is implemented. As another example, an example ticket time data field associated with a closed incident ticket data object may indicate when the service incident is resolved. In some embodiments, the ticket time data field may comprise text string(s), numerical character(s), alphabetical character(s), alphanumeric code(s), ASCII character(s), and/or the like.

In the present disclosure, the term "incident and change management user interface" refers to a user interface that is generated by or caused to be generated by the integrated service and asset management platform that can facilitate incident management and change management. For example, an example incident and change management user interface may illustrate connections from incident ticket data objects and change ticket data objects to service data objects in the integrated service and asset management platform, details of which are described herein.

The terms "user device" or "client device" refer to computer hardware and/or software that is configured to enable a user to access an integrated incident and change management environment. Client devices may include, without limitation, smart phones, tablet computers, laptop computers, wearables, personal computers, enterprise computers, and the like.

A client device may be associated with one or more clients or users. The term "client" or "user" refers to an individual, group of individuals, business, organization, and the like. Users referred to herein are discussed largely in connection with client device enabled activity for receiving data and information to/from the integrated incident and change management environment and/or other device(s) associated with the integrated incident and change management environment.

In the present disclosure, the terms "client profile," "user profile," "user account," and "user account details" refer to data, files, and other information associated with a user. In some examples, the collection of data items in the client profile may include user identifiers.

The terms "member identifier," "client identifier," or "user identifier" refer to an identifier that uniquely identifies information stored in an integrated incident and change management environment that is related to a client or a user. For example, a user identifier may comprise a username, a user email address, a user ID number, and/or the like. In some embodiments, the user identifier may be in the form of text string(s), numerical character(s), alphabetical character(s), alphanumeric code(s), ASCII character(s), and/or the like.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an asset and configuration management server, a service management server, and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example integrated incident and change management environment 100 within which embodiments of the present disclosure may operate. In the example shown in FIG. 1, the integrated incident and change management environment 100 may comprise an integrated service and asset management platform 105 in electronic communication with one or more client devices 101A, 101B, . . . 101N via a communication network 103. In some embodiments, the integrated incident and change management environment 100 may provide functionalities for managing changes and incidents associated with assets and/or services.

As described above, the integrated service and asset management platform 105 may comprise one or more sub-platforms and/or systems. In the example shown in FIG. 1, the integrated service and asset management platform 105 comprises a service management server 107, an asset and configuration management server 109, an incident and change ticket data object repository 111 and an asset and service data object mapping repository 113.

In some embodiments, the asset and configuration management server 109 may comprise software components and associated hardware components that are configured to map each service data object to a corresponding service that is within, associated with, and/or provided by the organization, as well as each asset data object to a corresponding asset that is within, associated with, and/or provided by the organization. As such, the asset and configuration management server 109 allows users from an organization to manage services, assets, and configurations that are within, associated with, and/or provided by the organization.

In some embodiments, the asset and service data object mapping repository 113 stores mapping data that indicates relationships between service data objects, between asset data objects, and/or between service data objects and asset data objects, details of which are described herein. In some embodiments, the asset and service data object mapping repository 113 may be embodied as a data storage device such as a Network Attached Storage (NAS) device or devices, or as a separate database server or servers.

In some embodiments, the service management server 107 receives and/or generates ticket data objects, such as but not limited to, change ticket data objects and incident ticket data objects as described above. For example, a service change request may be in the form of an application programming interface (API) call to the service management server 107. In some embodiments, the API call may comprise data/information related to various metadata associated with the service change request. For example, the API call may comprise data/information related to the service data object(s) for which the service change is requested. As another example, in response to receiving user input reporting a service incident, a service incident notification in the form of an API call may be initiated to the service management server 107. In some embodiments, the API call may comprise data/information related to various metadata associated with the service incident notification. For example, the API call may comprise data/information that describes a context, a description, and/or the like associated with the incident.

In some embodiments, the service management server 107 may store one or more ticket data objects (such as, but not limited to, change ticket data objects and incident ticket data objects) on the incident and change ticket data object repository 111. In some embodiments, the incident and change ticket data object repository 111 may be embodied as a data storage device such as a Network Attached Storage (NAS) device or devices, or as a separate database server or servers.

In some embodiments, in response to the service management server 107 receiving a service change request and/or a service incident notification that is related to a service data object, the asset and configuration management server 109 may determine one or more related service data objects, details of which are described herein. In some embodiments, the service management server 107 may further determine one or more related ticket data objects that are associated with the service data object and/or the one or more related service data objects, details of which are described herein.

In some embodiments, based at least in part on the related service data objects and the related ticket data objects, the integrated service and asset management platform 105 may cause rendering of an incident and change management user interface on a client device (for example, one or more of client devices 101A-101N), details of which are described herein.

In some embodiments, the communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include an 802.11, 802.16, 802.20, and/or WiMax network. Further, the communication network 103 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the integrated service and asset management platform 105. In some embodiments, the protocol is a custom protocol of JSON objects sent via a Web Socket channel. In some embodiments, the protocol is JSON over RPC, JSON over REST/ HTTP, and the like.

While the description above provides some examples of ticket data objects (for example, change ticket data objects and/or incident ticket data objects) being generated by the integrated service and asset management platform 105 and stored in one or more data object repositories, it is noted that the scope of the present disclosure is not limited to the description above. In some examples, one or more ticket data objects (for example, change ticket data objects and/or incident ticket data objects) are generated and stored locally by a client device. For example, a client device may generate ticket data objects (for example, change ticket data objects and/or incident ticket data objects) based on inputs of service change request or service incident notification received by the client device, and may store ticket data objects (for example, change ticket data objects and/or incident ticket data objects) locally.

It is noted that various components of the integrated incident and change management environment 100 may leverage the same computer or computing apparatus to perform various operations. For example, various components of the service management server 107 and the asset and configuration management server 109 may leverage the same computer or computing apparatus to perform various operations. Additionally, or alternatively, various components of the asset and service data object mapping repository 113 and the incident and change ticket data object repository 111 may leverage the same computer or computing apparatus to perform various operations.

Example Apparatuses for Implementing Embodiments of the Present Disclosure

As described above in connection with FIG. 1, an example integrated service and asset management platform may comprise one or more servers. In some embodiments, a server of an example integrated service and asset management platform (such as, but not limited to, the service management server 107 and/or the asset and configuration management server 109 of FIG. 1) may be embodied by one or more computing systems, such as apparatus 200 shown in FIG. 2.

The apparatus 200 may include a processor 202, a memory 204, an input/output circuitry 206, and a communications circuitry 208. The apparatus 200 may be configured to execute the operations described above with respect to FIG. 1 and below with respect to FIG. 4 to FIG. 13. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some examples, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some examples, the processor 202 may be configured to execute instructions stored in the memory 204 or otherwise accessible to the processor 202. In some examples, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include the input/output circuitry 206 that may, in turn, be in communication with the processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware)

stored on a memory accessible to the processor (e.g., the memory 204, and/or the like).

In some embodiments, the input/output circuitry 206 further comprises a camera or a scanner. In some embodiments, a user may utilize the camera to scan QR codes and barcodes. In some embodiments, QR codes and barcodes can be key mechanisms for retrieving assets from the database and for adding to it, as they save time and reduce human error associated with having to work with long complex identifiers that some assets may have. In some embodiments, QR codes and barcodes are scanned with some form of camera or bar code scanner (or other scanner type) of the input/output circuitry 206.

In some embodiments, the integrated service and asset management platform may generate QR codes and barcodes for the assets. As such, various embodiments of the present disclosure bridge the gap between the physical world and the digital world while allowing automation of real-world human activities. For example, the apparatus 200 may be in the form of a mobile phone, and the manufacturing company of the mobile phone may utilize the integrated service and asset management platform and the QR code scanning ability of the apparatus 200 to set up an automated production line with robots that pick up components such as LED screens, scan them (via QR code) to identify them, test them, confirm that they work, log the result in the database using the scanned ID, then pass the component to the next station (if they pass) or put the component aside (if they fail). This could all be done without human intervention. In some embodiments, this quality assurance (QA) process and log process can save a lot of time and can be critical in high-volume automated factories.

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network (such as the communication network 103 as shown in FIG. 1). For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

The client devices 101A, 101B, . . . , 101N of FIG. 1 may include one or more computing systems, such as the apparatus 300 shown in FIG. 3. The apparatus 300 may be configured to execute the operations described above with respect to FIG. 1 and below with respect to FIG. 4 to FIG. 13. The apparatus 300 may include a processor 301, a memory 303, an input/output circuitry 307, a communications circuitry 305, an input/output circuitry 307, and/or a display 309. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 301 (and/or co-processor or any other processing circuitry assisting or otherwise associated with the processor) may be in communication with the memory 303 via a bus for passing information among components of the apparatus. The memory 303 may be non-transitory and may include, for example, one or more volatile and/or non-volatile memories. In other words, for example, the memory 303 may be an electronic storage device (e.g., a computer readable storage medium). The memory 303 may be configured to store information, data, content, applications, instructions, or the like, for enabling the apparatus 300 to carry out various functions in accordance with example embodiments of the present disclosure.

The processor 301 may be embodied in a number of different ways and may, for example, include one or more processing devices configured to perform independently. Additionally, or alternatively, the processor 301 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 301 may be configured to execute instructions stored in the memory 303 or otherwise accessible to the processor. Alternatively, or additionally, the processor 301 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor to perform the algorithms and/or operations described herein when the instructions are executed.

In some embodiments, the apparatus 300 may include the input/output circuitry 307 that may, in turn, be in communication with the processor 301 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 303, and/or the like).

In some embodiments, the apparatus 300 may include the display 309 that may, in turn, be in communication with the processor 301 to display renderings of user interfaces. In various examples of the present disclosure, the display 309 may include a liquid crystal display (LCD), a light-emitting diode (LED) display, a plasma (PDP) display, a quantum dot (QLED) display, and/or the like.

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network. For example, the communications circuitry 305 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Methods for Implementing Embodiments of the Present Disclosure

Various example methods described herein, including, for example, those as shown in FIG. 4 to FIG. 9, may provide various technical advantages and/or improvements that are described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4 to FIG. 9 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4, an example block diagram illustrates an example of an integrated service and asset management platform 400 generating an example incident and change management user interface in accordance with various example embodiments of the present disclosure.

In the example shown in FIG. 4, the example integrated service and asset management platform 400 comprises an example asset and configuration management system 402 (for example, including an asset and configuration management server) and an example service management system 404 (for example, including a service management server).

In some embodiments, the asset and configuration management system 402 may comprise service data objects such as, but not limited to, service data object 406A, service data object 406B, service data object 406C, and service data object 406D. In some embodiments, the asset and configuration management system 402 may generate mapping data indicating the relationships between service data objects, such as, but not limited to, service data object 406A, service data object 406B, service data object 406C, and service data object 406D. For example, the asset and configuration management system 402 may comprise an asset and service data object mapping repository that comprises mapping data. In some embodiments, the mapping data may be determined based at least in part on the related service data fields associated with the service data objects.

For example, each of the service data object 406A, the service data object 406B, the service data object 406C, and the service data object 406D may correspond to a software-based service that is within, associated with, and/or provided by an organization. As an example, the service data object 406C may represent a transaction service that is responsible for external transfers and inter bank-to-bank transfers. In this example, the service data object 406D may represent an accounts service that is responsible for managing a user's bank accounts.

In some embodiments, the integrated service and asset management platform 400 may receive a ticket data object 408A. In some embodiments, the ticket data object 408A comprises an affected service data field 410A that indicates the service data object 406C.

For example, the ticket data object 408A may be a change ticket data object, which indicates a service change request associated with the service data object 406C (for example, a service change request associated with the transaction service). In some embodiments, the ticket data object 408A may be an incident ticket data object, which indicates a service incident notification associated with the service data object 406C (for example, a service incident notification associated with the transaction service).

In some embodiments, based on the ticket data object and the affected service data field, the integrated service and asset management platform 400 may determine one or more related service data objects and/or one or more related ticket data objects, and generate an example incident and change management user interface based at least in part on the one or more related service data objects and/or one or more related ticket data objects.

As described above, the affected service data field 410A of the ticket data object 408A indicates a service data object 406C in the asset and configuration management system 402. As such, the affected service data field 410A connects the ticket data object 408A in the service management system 404 to the service data object 406C in the asset and configuration management system 402.

In some embodiments, the service data object 406C comprises a related service data field 412C. As described above, the related service data field 412C indicates one or more other service data objects upon which the service data object 406C depends and/or one or more other service data objects that depend on the service data object 406C. In the example shown in FIG. 4, the related service data field 412C indicates that the service data object 406C is a parent service data object to the service data object 406D. Similarly, the related service data field 412A indicates that the service data object 406A is a parent service data object to the service data object 406C, and the related service data field 412B indicates that the service data object 406B is a parent service data object to the service data object 406C. In some embodiments, the asset and configuration management system 402 determines that the service data object 406A, the service data object 406B, and the service data object 406D are related service data objects to the service data object 406C.

In some embodiments, to generate the incident and change management user interface, the integrated service and asset management platform 400 may traverse ticket data objects stored in the service management system 404 to identify ticket data objects that are related to the service data object 406C and/or related to the related service data objects 406A, 406B, and/or 406D. In some embodiments, the service management system 404 may determine that a ticket data object in the service management system 404 is related to a service data object in the asset and configuration management system 402 based on the affected service data field of the ticket data object.

Additionally, FIG. 4 illustrates how to determine that the ticket data object 408B is a related ticket data object of the service data object 406D, and how to determine that the service data object 406D is dependent on the service data object 406C.

As described above, each ticket data object may comprise an affected service data field. The affected service data field indicates a service data object that is affected by the ticket data object. For example, if the ticket data object represents a service change request, the affected service data field of the ticket data object indicates a service data object that is affected by the service change request (for example, a service change associated with the service data object). Additionally, or alternatively, if the ticket data object represents a service incident notification, the affected service data field of the ticket data object represents a service data object that is affected by the service incident notification (for example, a service incident happened on the service data object).

In the example shown in FIG. 4, the asset and configuration management system 402 may transmit data to the service management system 404 indicating that the service data objects 406A, service data object 406B, and the service data object 406D are related service data objects of the service data object 406C. In some embodiments, the service management system 404 may traverse the ticket data objects stored in the service management system 404 based on their affected service data fields. For example, the service management system 404 may select ticket data objects based on their affected service data fields indicating the service data object 406C and/or one of the related service data objects (for example, one of the service data object 406A, the service data object 406B, or the service data object 406D). In the example shown in FIG. 4, the service management system 404 may determine that the ticket data object 408B comprises an affected service data field 410B that indicates service data object 406D (which is one of the related service data objects), and may determine that the ticket data object 408B is a related ticket data object of the ticket data object 408A.

In some embodiments, the incident and asset management platform 400 may generate the incident and change management user interface based at least in part on the service data object 406C and one or more ticket data objects that are related to the service data object 406C. Additionally, or alternatively, the incident and asset management platform 400 may generate the incident and change management user interface based at least in part on the related service data objects (for example, the service data object 406D) and one or more ticket data objects that are related to one or more of the related service data objects (for example, the ticket data object 408B).

Referring now to FIG. 5, an example method 500 is illustrated. In particular, the example method 500 illustrates example steps/operations of rendering an example incident and change management user interface in accordance with example embodiments of the present disclosure. In some embodiments, as described above, the incident and change management user interface may be associated with an integrated service and asset management platform.

In some embodiments, the integrated service and asset management platform is associated with a plurality of service data objects and a plurality of ticket data objects. For example, as described above, the integrated service and asset management platform allows users from an organization to manage incidents and changes associated with services that are within, associated with, and/or provided by the organization and represented by service data objects. In some embodiments, the integrated service and asset management platform may generate and/or store ticket data objects that are associated with the service data objects. For example, the integrated service and asset management platform may generate and/or store change ticket data objects that represent service changes associated with services of the organization and represented by service data objects. As another example, the integrated service and asset management platform may generate and/or store incident ticket data objects that represent service incidents associated with services of the organization and represented by service data objects.

In the example shown in FIG. 5, the example method 500 starts at step/operation 501 and then proceeds to step/operation 503. At step/operation 503, a processing circuitry (such as a processor of a server of the integrated service and asset management platform 105 described above in connection with FIG. 1 and FIG. 2) may receive a ticket data object.

In some embodiments, the ticket data object comprises at least one of an incident ticket data object or a change ticket data object. As described above, an incident ticket data object represents a service incident associated with a service data object, and a change ticket data object represents a service change associated with a service data object.

In some embodiments, the processing circuitry may receive a ticket data object from a client device (such as, but not limited to, client devices 101A-101N as described above). In some embodiments, the ticket data object is associated with a service data object from the plurality of service data objects that the integrated service and asset management platform manages.

For example, the ticket data object comprises an affected service data field indicating a service data object. The affected service data field may indicate one or more services that are affected by the ticket data object. In some embodiments, the service data object is one of a plurality of service data objects that are associated with the integrated service and asset management platform.

As an example, similar to those described above in connection with FIG. 4, the service management system may receive a ticket data object that comprises an affected service data field, and the affected service data field may indicate a service data object associated with the asset and configuration management system.

Referring back to FIG. 5, subsequent to step/operation 503, the method 500 proceeds to step/operation 505. At step/operation 505, a processing circuitry (such as a processor of a server of the integrated service and asset management platform 105 described above in connection with FIG. 1 and FIG. 2) may determine at least one related ticket data object from the plurality of ticket data objects.

In some embodiments, in response to receiving the ticket data object, the processing circuitry may determine at least one related ticket data object from a plurality of ticket data objects (for example, stored in the incident and change ticket data object repository 111 as shown in the example of FIG. 1). In some embodiments, the processing circuitry may determine one or more related service data objects from a plurality of service data objects managed by the integrated service and asset management platform.

As described above, a related ticket data object is a ticket data object that is related to another ticket data object. In the example shown in FIG. 5, the related ticket data object is related to the ticket data object received at step/operation 503.

In some embodiments, the processing circuitry may determine the at least one related ticket data object from the plurality of ticket data objects based at least in part on affected service data fields. For example, step/operation 505 may comprise one or more additional steps. As shown in FIG. 5, in some embodiments, step/operation 505 comprises step/operation 511 and step/operation 513.

In some embodiments, at step/operation 511, a processing circuitry (such as a processor of a server of the integrated service and asset management platform 105 described above in connection with FIG. 1 and FIG. 2) may identify at least one related service data object from the plurality of service data objects.

As described above, the ticket data object received at step/operation 503 comprises an affected service data field. In some embodiments, the affected service data field indicates at least one service data object from the plurality of service data objects that are managed by the integrated service and asset management platform. Additionally, or alternatively, the ticket data object received at step/operation 503 comprises an affected asset data field. In some embodiments, the affected asset data field indicates at least one asset data object from the plurality of asset data objects that are managed by the integrated service and asset management platform.

For example, if the ticket data object is a change ticket data object, the affected service data field indicates one or more service data objects that were affected by the service change that is represented by the change ticket data object. As another example, if the ticket data object is an incident ticket data object, the affected service data field indicates one or more service data objects that were affected by the service incident that is represented by the incident ticket data object.

In some embodiments, the processing circuitry may determine at least one related service data object based on the related service data field of the service data object affected by the ticket data object. For example, the ticket data object received at step/operation 503 may comprise an affected service data field indicating service data object A, and the processing circuitry may determine related service data object based on the related service data field of the service data object A. For example, the related service data field may indicate that service data objects B, C, and D are related to the service data object A.

In some embodiments, subsequent to step/operation 511, the example method 500 proceeds to step/operation 513. At step/operation 513, a processing circuitry (such as a processor of a server of the integrated service and asset management platform 105 described above in connection with FIG. 1 and FIG. 2) may select the at least one related ticket data object based at least in part on the affected service data fields associated with the ticket data objects.

In some embodiments, the processing circuitry selects the at least one related ticket data object from the plurality of ticket data objects based at least in part on an affected service data field of the at least one related ticket data object indicating the service data object associated with the ticket data object received at step/operation 503 or the at least one related service data object identified at step/operation 511.

At step/operation 513, the processing circuitry may retrieve the plurality of ticket data objects from a data repository (such as, but not limited to, the example incident and change ticket data object repository 111 described above in connection with FIG. 1). In some embodiments, the processing circuitry may determine whether the corresponding affected service data fields of these ticket data objects indicate the service data object associated with the ticket data object received at step/operation 503 or the at least one related service data object identified at step/operation 511.

Continuing from the example above, the ticket data object received at step/operation 503 may indicate service data object A in its affected service data field. For example, the ticket data object may indicate a service change request on a software-based service that is represented by the service data object A. As another example, the ticket data object may indicate a service incident notification on a software-based service that is represented by the service data object A. Additionally, the processing circuitry may determine that service data object B, service data object C, and service data object D are related service data objects.

Continuing from the example above, the processing circuitry may traverse the incident and change ticket data object repository based on the affected service data fields of the ticket data objects.

If an affected service data field of a ticket data object indicates the service data object A or one of the service data object B, service data object C, or service data object D, the processing circuitry may determine the ticket data object as a related ticket data object at step/operation 505.

If an affected service data field of a ticket data object does not indicate any of the service data object A, service data object B, service data object C, or service data object D, the processing circuitry may determine that the ticket data object is not a related ticket data object at step/operation 505.

Referring back to FIG. 5, subsequent to step/operation 505 and/or step/operation 513, the example method 500 proceeds to step/operation 507. At step/operation 507, a processing circuitry (such as a processor of a server of the integrated service and asset management platform 105 described above in connection with FIG. 1 and FIG. 2) may cause rendering, on the client device, the incident and change management user interface.

In some embodiments, the processing circuitry causes rendering the incident and change management user interface based at least in part on the ticket data object received at step/operation 503, the service data object that is associated with the ticket data object received at step/operation 503, and the at least one related ticket data object determined at step/operation 505.

For example, the processing circuitry may cause the client device to generate a ticket user interface icon based at least in part on the ticket data object received at step/operation 503 and a service user interface icon based at least in part on the service data object indicated in the affected service data field of the ticket data object. In some embodiments, the processing circuitry may further cause the client device to generate at least one related service user interface icon based at least in part on the related service data object identified at step/operation 511. In some embodiments, the processing circuitry may establish a visual connection between the service user interface icon and the at least one related service user interface icon.

In some embodiments, the processing circuitry may generate at least one related ticket user interface icons based at least in part on the at least one related ticket data object determined at step/operation 513. The processing circuitry may further establish a visual connection between the at least one related ticket user interface icon and its corresponding service user interface icon or related service user interface icon on the incident and change management user interface, providing users of the integrated service and asset management platform an intuitive way to identify other ticket data objects that are related to the ticket data object received at step/operation 503. Additional details associated with the incident and change management user interface are described herein.

In some embodiments, subsequent to step/operation 507, the example method 500 proceeds to step/operation 509 and ends.

Referring now to FIG. 6, an example method 600 is illustrated. In particular, the example method 600 illustrates example steps/operations of determining at least one related change ticket data object in response to receiving an incident ticket data object in accordance with example embodiments of the present disclosure.

In the example shown in FIG. 6, the example method 600 starts at step/operation 602 and then proceeds to step/operation 604. At step/operation 604, a processing circuitry (such as a processor of a server of the integrated service and asset management platform 105 described above in connection with FIG. 1 and FIG. 2) may receive an incident ticket data object.

As described above, a ticket data object in accordance with embodiments of the present disclosure may comprise an incident ticket data object. For example, the incident ticket data object may comprise data and/or information associated with the event that causes a disruption to and/or a reduction in the quality of the software-based service. In some embodiments, the incident ticket data object indicates at least one service incident notification associated with the service data object. For example, the at least one service incident notification may indicate the existence of the event that causes a disruption to and/or a reduction in the quality of the software-based service, and/or may comprise data and/or information associated with the event.

Similar to those described above in connection with at least step/operation 503 of FIG. 5, the incident ticket data object received at step/operation 604 may be associated with a service data object from the plurality of service data objects that the integrated service and asset management platform manages.

In some embodiments, subsequent to step/operation 604, the example method 600 proceeds to step/operation 606. At step/operation 606, a processing circuitry (such as a processor of a server of the integrated service and asset management platform 105 described above in connection with FIG. 1 and FIG. 2) may determine at least one related change ticket data object. In some embodiments, the at least one related change ticket data object indicates at least one related service change request.

In some embodiments, the processing circuitry may determine the at least one related change ticket data object similar to those described above in connection with at least step/operation 505, step/operation 511, and step/operation 513 of FIG. 5. For example, the at least one related ticket data object determined at step/operation 505 of FIG. 5 may comprise at least one related change ticket data object.

For example, the processing circuitry may retrieve a plurality of change ticket data objects from a data repository (such as, but not limited to, the example incident and change ticket data object repository 111 described above in connection with FIG. 1). In some embodiments, the processing circuitry may determine whether the corresponding affected service data fields of these change ticket data objects indicate the service data object indicated in the affected service data field of the incident ticket data object received at step/operation 604 or a related service data object of the service data object.

If an affected service data field of a change ticket data object indicates the service data object associated with the incident ticket data object received at step/operation 604 or a related service data object, the processing circuitry may select the change ticket data object at step/operation 606. If an affected service data field of a change ticket data object does not indicate the service data object associated with the incident ticket data object received at step/operation 604 or any related service data object, the processing circuitry may not select the change ticket data object at step/operation 606.

In some embodiments, the at least one related change ticket data object indicates at least one service change request associated with the service data object. For example, if the incident ticket data object received at step/operation 604 is associated with service data object A, the at least one related change ticket data object determined at step/operation 606 is also associated with the service data object A.

In some embodiments, subsequent to determining the at least one related change ticket data object at step/operation 606, the processing circuitry may cause generating and/or updating an incident and change management user interface on a client device. For example, the processing circuitry may cause generating an incident ticket user interface icon on the incident and change management user interface based on the incident ticket data object received at step/operation 604, cause generating a service user interface icon based on the service data object indicated in the affected service data field of the incident ticket data object received at step/operation 604, cause generating at least one change ticket user interface icon based on the at least one related change ticket data object determined at step/operation 606, and establish at least one visual connection from the incident ticket user interface icon to the service user interface icon, and at least one visual connection from the at least one change ticket user interface icon to the service user interface icon or a related service user interface icon (as applicable) on the incident and change management user interface.

While the description above provides an example of determining at least one related change ticket data object, it is noted that the scope of the present disclosure is not limited to the description above. For example, the processing circuitry may determine the at least one related ticket data object that comprises at least one related incident ticket data object. In some embodiments, the at least one related incident ticket data object indicates at least one related service incident notification associated with the service data object or associated with the at least one related service data object.

In some embodiments, subsequent to step/operation 606, the example method 600 proceeds to step/operation 608 and ends.

Referring now to FIG. 7, an example method 700 is illustrated. In particular, the example method 700 illustrates example steps/operations of determining at least one related incident ticket data object in response to receiving a change ticket data object in accordance with example embodiments of the present disclosure.

In the example shown in FIG. 7, the example method 700 starts at step/operation 701 and then proceeds to step/operation 703. At step/operation 703, a processing circuitry (such as a processor of a server of the integrated service and asset management platform 105 described above in connection with FIG. 1 and FIG. 2) may receive a change ticket data object.

As described above, a ticket data object in accordance with embodiments of the present disclosure may comprise a change ticket data object. For example, the change ticket data object may comprise data and/or information associated with the addition, modification, or removal of one or more software components that could have an effect or impact on IT services within, associated with and/or provided by an organization. In some embodiments, the change ticket data object indicates at least one service change request associated with the service data object. For example, the at least one service change request may indicate a user's request for a service change associated with a software-based service that is within or provided by the organization.

Similar to those described above in connection with at least step/operation 503 of FIG. 5, the change ticket data object received at step/operation 703 may be associated with a service data object from the plurality of service data objects that the integrated service and asset management platform manages.

In some embodiments, subsequent to step/operation 703, the example method 700 proceeds to step/operation 705. At step/operation 705, a processing circuitry (such as a processor of a server of the integrated service and asset management platform 105 described above in connection with FIG. 1 and FIG. 2) may determine at least one related incident ticket data object.

In some embodiments, the processing circuitry may determine the at least one related incident ticket data object similar to those described above in connection with at least step/operation 505, step/operation 511, and step/operation 513 of FIG. 5. For example, the at least one related ticket data object determined at step/operation 505 of FIG. 5 may comprise at least one related incident ticket data object.

For example, the processing circuitry may retrieve a plurality of incident ticket data objects from a data repository (such as, but not limited to, the example incident and change ticket data object repository 111 described above in connection with FIG. 1). In some embodiments, the processing circuitry may determine whether the corresponding affected service data fields of these incident ticket data objects indicate the service data object from the affected service data field of the change ticket data object received at step/operation 703 or at least one related service data object of the service data object.

If an affected service data field of an incident ticket data object indicates the service data object associated with the change ticket data object received at step/operation 703 or a related service data object, the processing circuitry may select the incident ticket data object at step/operation 705. If an affected service data field of an incident ticket data object does not indicate the service data object associated with the change ticket data object received at step/operation 703 or any related service data object, the processing circuitry may not select the incident ticket data object at step/operation 705.

In some embodiments, the at least one related incident ticket data object indicates at least one service incident notification associated with the service data object. For example, if the change ticket data object received at step/operation 703 is associated with service data object A, the at least one related incident ticket data object determined at step/operation 705 is also associated with the service data object A.

In some embodiments, subsequent to determining the at least one related incident ticket data object at step/operation 705, the processing circuitry may cause generating and/or updating an incident and change management user interface on a client device. For example, the processing circuitry may cause generating a change ticket user interface icon on the incident and change management user interface based on the change ticket data object received at step/operation 703, cause generating a service user interface icon based on the service data object indicated in the affected service data field of the change ticket data object, cause generating at least one incident ticket user interface icon based on the at least one related incident ticket data object determined at step/operation 705, and establish at least one visual connection from the change ticket user interface icon to the service user interface icon, and establish at least one visual connection from the at least one incident ticket user interface icon to the service user interface icon or a related service user interface icon (as applicable) on the incident and change management user interface.

While the description above provides an example of determining at least one related incident ticket data object, it is noted that the scope of the present disclosure is not limited to the description above. For example, the processing circuitry may determine the at least one related ticket data object that comprises at least one related change ticket data object. In some embodiments, the at least one related change ticket data object indicates at least one related service change request associated with the service data object or the at least one related service data object.

In some embodiments, subsequent to step/operation 705, the example method 700 proceeds to step/operation 707 and ends.

Referring now to FIG. 8, an example method 800 is illustrated. In particular, the example method 800 illustrates example steps/operations of generating incident and change management user interfaces based at least in part on the related service data objects.

In the example shown in FIG. 8, the example method 800 starts at step/operation 802 and then proceeds to step/operation 804. At step/operation 804, a processing circuitry (such as a processor of a server of the integrated service and asset management platform 105 described above in connection with FIG. 1 and FIG. 2) may identify a related service data field associated with a service data object.

In some embodiments, the integrated service and asset management platform may receive a ticket data object, similar to those described above in connection with FIG. 4 to FIG. 7. In some embodiments, the ticket data object may comprise an affected service data field that indicates a service data object, similar to those described above in connection with FIG. 4 to FIG. 7.

In some embodiments, the processing circuitry may identify the related service data field of the service data object associated with the ticket data object received by the integrated service and asset management platform in connection with the various examples described above in connection with FIG. 5 to FIG. 7. For example, the processing circuitry may identify the related service data field of a service data object that is associated with the ticket data object received by the integrated service and asset management platform at step/operation 503 of FIG. 5. Additionally, or alternatively, the processing circuitry may identify the related service data field of a service data object that is associated with the incident ticket data object received by the integrated service and asset management platform at step/operation 604 of FIG. 6. Additionally, or alternatively, the processing circuitry may identify the related service data field of a service data object that is associated with the change ticket data object received by the integrated service and asset management platform at step/operation 703 of FIG. 7.

As described above, the related service data field may indicate at least one child service data object associated with the service data object or at least one parent service data object associated with the service data object. For example, the related service data field of the service data object may indicate one or more other service data objects that depend on the service data object. Additionally, or alternatively, the related service data field of the service data object may indicate one or more other service data objects upon which the service data object depends. In some embodiments, the processing circuitry may determine the at least one child service data object and/or at least one parent service data object associated with the service data object as related service data objects.

For example, the processing circuitry may determine that the ticket data object comprises an affected service data field indicating a service data object A, and the service data object A may comprise a related service data field that indicates a service data object B.

In some embodiments, the service data object B may be dependent upon the service data object A. For example, service data object B may require data and/or information from service data object A to perform the functions of software-based services as represented by the service data object B. As an example, the service data object that represents the accounts service may be dependent on the service data object that represents the transaction service.

In some embodiments, the service data object A may be dependent upon the service data object B. For example, service data object A may require data and/or information from service data object B to perform the functions of software-based services as represented by the service data object A.

Referring back to FIG. 8, in some embodiments, subsequent to step/operation 804, the example method 800 proceeds to step/operation 806. At step/operation 806, a processing circuitry (such as a processor of a server of the integrated service and asset management platform 105 described above in connection with FIG. 1 and FIG. 2) may select at least one related ticket data object from the plurality of ticket data objects.

In some embodiments, the processing circuitry may select at least one related ticket data object based at least in part on the related service data field identified at step/operation 804.

As described above, the related service data field may indicate at least one related service data object. For example, the related service data field may indicate at least one child service data object associated with the service data object or at least one parent service data object associated with the service data object.

In some embodiments, the processing circuitry may identify a plurality of affected service data fields associated with the plurality of ticket data objects. As described above, each of the plurality of ticket data objects comprises an affected service data field. In some embodiments, each of the plurality of affected service data fields associated with the plurality of ticket data objects indicates at least one service data object from the plurality of service data objects that are managed by the integrated service and asset management platform In some embodiments, the processing circuitry may select the at least one related ticket data object from the plurality of ticket data objects based at least in part on the affected service data field of the at least one related ticket data object indicating one of the at least one related service data object (for example, at least one child service data object or at least one parent service data object) as indicated in the related service data field that is identified at step/operation 804.

For example, continuing from the example above, the processing circuitry may retrieve the plurality of ticket data objects from a data repository (such as, but not limited to, the example incident and change ticket data object repository 111 described above in connection with FIG. 1), and may determine their corresponding affected service data fields. In some embodiments, the processing circuitry may determine whether the corresponding affected service data fields of these ticket data objects indicate the child service data object or the parent service data object indicated by the related service data field identified at step/operation 804.

For example, if an affected service data field of a ticket data object indicates one of the at least one related service data object from step/operation 804, the processing circuitry may select the ticket data object at step/operation 806 as a related ticket data object.

As another example, if an affected service data field of a ticket data object does not indicate one of the at least one related service data object from step/operation 804, the processing circuitry may not select the ticket data object as a related ticket data object at step/operation 806.

In some embodiments, subsequent to step/operation 806, the example method 800 proceeds to step/operation 808. At step/operation 808, a processing circuitry (such as a processor of a server of the integrated service and asset management platform 105 described above in connection with FIG. 1 and FIG. 2) may generate an incident and change management user interface.

In some embodiments, the processing circuitry may generate the incident and change management user interface based at least in part on the at least one child service data object or the at least one parent service data object that is indicated in the related service data field at step/operation 804 and/or the at least one related ticket data object that is associated with the child service data object or the parent service data object and selected at step/operation 806.

For example, the processing circuitry may cause generating a first ticket user interface icon on the incident and change management user interface based on the ticket data object received at step/operation 804, cause generating a first service user interface icon based on the service data object indicted in the affected service data field of the ticket data object, cause generating a second service user interface icon based on the child service data object or the parent service data object associated with step/operation 804, cause generating a second ticket user interface icon based on the related ticket data object selected at step/operation 806.

In some embodiments, the processing circuitry may establish a visual connection between the first service user interface icon and the second service user interface icon on the incident and change management user interface. In some embodiments, the processing circuitry may establish a visual connection between the first ticket user interface icon and the first service user interface icon on the incident and change management user interface. In some embodiments, the processing circuitry may establish a visual connection between the second ticket user interface icon and the second service user interface icon on the incident and change management user interface.

Referring back to FIG. 8, subsequent to step/operation 808, the example method 800 proceeds to step/operation 810 and ends.

Referring now to FIG. 9, an example method 900 is illustrated. In particular, the example method 900 illustrates example steps/operations of generating the incident and change management user interface based at least in part on ticket time data fields in accordance with example embodiments of the present disclosure.

In the example shown in FIG. 9, the example method 900 starts at step/operation 901 and then proceeds to step/operation 903. At step/operation 903, a processing circuitry (such as a processor of a server of the integrated service and asset management platform 105 described above in connection with FIG. 1 and FIG. 2) may identify at least one ticket time data field.

In some embodiments, the processing circuitry may identify at least one ticket time data field associated with the at least one related ticket data object. In some embodiments, the least one related ticket data object may be determined based at least in part on the example method 500 show in FIG. 5, the example method 600 shown in FIG. 6, the example method 700 shown in FIG. 7, and/or the example method 800 shown in FIG. 8.

In some embodiments, each related ticket data object comprises a ticket time data field that indicates at least one ticket time associated with the at least one related ticket data object. For example, the at least one ticket time associated with an open change ticket data object may indicate when the service change is requested. As another example, an example ticket time data field associated with an open incident ticket data object may indicate when the service incident occurred. As another example, an example ticket time data field associated with a closed change ticket data object may indicate when the service change is approved or implemented. As another example, an example ticket time data field associated with a closed incident ticket data object may indicate when the service incident is resolved.

In some embodiments, subsequent to step/operation 903, the example method 900 proceeds to step/operation 905. At step/operation 905, a processing circuitry (such as a processor of a server of the integrated service and asset management platform 105 described above in connection with FIG. 1 and FIG. 2) may generate the incident and change management user interface based at least in part on the at least one ticket time from the at least one ticket time data field.

For example, the processing circuitry may generate one ticket user interface element for each related ticket data object. In some embodiments, the processing circuitry may arrange the at least one ticket user interface elements on the incident and change management user interface based on their corresponding ticket time on a timeline (for example, an activity timeline user interface sub-pane described herein), so as to provide users of the integrated service and asset management platform an intuitive way of viewing related changes and/or incidents.

As such, various example incident and change management user interfaces in accordance with embodiments of the present disclosure provide various technical benefits and advantages. For example, the combinations of related services and a specific time range (for example, based on a user input) can narrow down the amount of related ticket data objects that are rendered for display on the example incident and change management user interfaces, so that the users can more easily resolve the tickets. As an example, users may identify the more recent changes (based on ticket time associated with change ticket data objects) that may have caused an incident (represented by an incident ticket data object). Additionally or alternatively, the users may identify more recent active incidents (based on ticket time associated with incident ticket data objects) that could affect deployments of a change. Additionally or alternatively, users may review changes that are currently scheduled to take place during the same time window as indicated by the ticket time to avoid releasing conflicting changes at same time (for example, users may define code freeze windows for teams based on the ticket time). In some embodiments, an example incident and change management user interface also displays the status of the ticket such as, but not limited to, "open" (which indicates that the ticket has not been resolved yet) and "done" (which indicates that the ticket has been resolved) and/or provide filters that allows users to narrow down the types/amount of tickets shown in the example incident and change management user interface.

Referring back to FIG. 9, subsequent to step/operation 905, the example method 900 proceeds to step/operation 907 and ends.

Example User Interfaces for Implementing Embodiments of the Present Disclosure Various example user interfaces described herein, including, for example, those as shown in FIG. 10 to FIG. 13, may provide various technical advantages and/or improvements as described above.

Referring now to FIG. 10 to FIG. 13, various example incident and change management user interfaces are illustrated. In particular, the example incident and change management user interfaces illustrate example software operations and user interface renderings associated with and/or in response to the integrated service and asset management platform receiving a change ticket data object.

Referring now to FIG. 10, an example incident and change management user interface 1000 is illustrated. In particular, the example incident and change management user interface 1000 comprises a change ticket user interface pane 1002.

For example, similar to those described above in connection with at least step/operation 503 of FIG. 5 and/or step/operation 703 of FIG. 7, an example integrated service and asset management platform in accordance with example embodiments of the present disclosure may receive a ticket data object that is in the form of a change ticket data object. In some embodiments, the change ticket data object may indicate a service change request associated with a service data object. In the example shown in FIG. 10, the ticket data object comprises a change ticket data object representing a service change request that is associated with a transaction service and is related to a real time transfer update. The change ticket user interface pane 1002 is generated based at least in part on the service change request represented by the change ticket data object.

In some embodiments, the change ticket user interface pane 1002 may comprise one or more portions or sub-panes. For example, the change ticket user interface pane 1002 may comprise a title sub-pane 1004, an initiator sub-pane 1006, and a description sub-pane 1008.

In some embodiments, the title sub-pane 1004 graphically displays a title associated with the change ticket data object. In the example shown in FIG. 10, the title sub-pane 1004 graphically displays that the title associated with the change ticket data object is "real team transfer update on transaction services."

In some embodiments, the initiator sub-pane 1006 graphically displays the name of the initiator associated with the change ticket data object (for example, the name of the user who submits the service change request). In the example shown in FIG. 10, the initiator sub-pane 1006 graphically displays that the name of the initiator associated with the change ticket data object is "Crystal Wu."

In some embodiments, the description sub-pane 1008 graphically displays the contents and/or a description associated with the change ticket data object. In the example shown in FIG. 10, the description sub-pane 1008 graphically displays the pipeline information, the repository information, the branch information, and the environment information associated with the service change request.

In some embodiments, the change ticket user interface pane 1002 may comprise a schedule change user interface element 1026. In some embodiments, the schedule change user interface element 1026 may be in the form of a button. When a user clicks, taps, or otherwise selects the schedule change user interface element 1026, a change calendar user interface may be displayed that allows a user to schedule a time for implementing the change. In some embodiments, the change calendar user interface may also display information indicating a change freeze window so that the user can schedule a time to implement the change while avoiding the change freeze window.

In some embodiments, the example incident and change management user interface 1000 may be displayed on a client device associated with a change approver or a CAB of an organization. As described above, the change approver or the CAB is responsible for reviewing and approving/rejecting the requested changes. In the example shown in FIG. 10, the example incident and change management user interface 1000 may comprise one or more status user interface elements 1010 and one or more option user interface elements 1012.

In some embodiments, the one or more status user interface elements 1010 may graphically display or illustrate the status of the change ticket data object. For example, the one or more status user interface elements 1010 may indicate that a current status of the change ticket data object is "awaiting approval," which shows that the service change request associated with change ticket data object (e.g. "real team transfer update on transaction services") is currently pending approval by the change approver or the CAB.

In some embodiments, the one or more option user interface elements 1012 may provide options for the change approver or the CAB to approve or deny the service change request associated with the change ticket data object. For example, the one or more option user interface elements 1012 may comprise an "approve" button and a "decline" button. When the approve button is clicked or tapped by the user (such as the change approver or the CAB), the integrated service and asset management platform may generate an electronic indication indicating that the service change request has been approved by the change approver or the CAB. When the decline button is clicked or tapped by the user (such as the change approver or the CAB), the integrated service and asset management platform may generate an electronic indication indicating that the service change request has been declined by the change approver or the CAB.

In the example shown in FIG. 10, the change ticket user interface pane 1002 may further comprise a related service and ticket sub-pane 1014. In the example shown in FIG. 10, the related service and ticket sub-pane 1014 graphically indicates one or more service data objects that are impacted by the service change request illustrated in the change ticket user interface pane 1002, as well as one or more related ticket data objects (for example, one or more related open incident ticket data objects) of the one or more service data objects. In some embodiments, the related service and ticket sub-pane 1014 may be generated by an example integrated service and asset management platform in response to receiving the ticket data object based on various example embodiments of the present disclosure, including, but not limited to, those described above in connection with at least FIG. 4 to FIG. 9.

In some embodiments, a processing circuitry may determine one or more incidents that are related to the service based at least in part on various example methods described herein. For example, the processing circuitry may determine the service data object associated with the ticket data object (for example, associated with the change ticket data object represented in the change ticket user interface pane 1002), and may select one or more ticket data objects that comprise affected service data fields indicating the service data object associated with the change ticket data object or a related service data objects, similar to those described above in connection with FIG. 4 to FIG. 9.

In the example shown in FIG. 10, the related service and ticket sub-pane 1014 comprises an affected service user interface element 1016, a related service and incident user interface element 1018, and a service description user interface element 1020.

In some embodiments, the affected service user interface element 1016 graphically displays a name of the service data object that is impacted by the ticket data object associated with the ticket data object (for example, associated with the change ticket data object represented in the change ticket user interface pane 1002). In the example shown in FIG. 10, the affected service user interface element 1016 indicates that the service data object impacted by the ticket data object represents the transaction service.

In some embodiments, the related service and incident user interface element 1018 graphically displays service incident notifications associated with the service data object that is impacted by the ticket data object (for example, associated with the change ticket data object represented in the change ticket user interface pane 1002) and/or one or more related service data objects of the service data object. In the example shown in FIG. 10, the related service and incident user interface element 1018 indicates that the service data object impacted by the ticket data object is also related to a service incident notification INC-123 (as represented by the incident user interface icon 1024) that is associated with a related service "accounts service" (as represented by the service user interface icon 1028).

In some embodiments, the related service and incident user interface element 1018 is generated in accordance with various example embodiments described herein, including, but not limited to, those described above in connection with FIG. 4 to FIG. 9. In some embodiments, when a user clicks, taps, and/or otherwise selects the incident user interface icon 1024, the processing circuitry may generate an incident ticket user interface pane based on the incident ticket object associated with the incident notification INC-123. In some embodiments, when a user clicks, taps, and/or otherwise selects the service user interface icon 1028, the processing circuitry may generate a service user interface pane based on the service data object associated with the accounts services.

In some embodiments, the service description user interface element 1020 graphically displays a description of the service data object that is impacted by the ticket data object (for example, associated with the change ticket data object represented in the change ticket user interface pane 1002).

In some embodiments, the related service and ticket sub-pane 1014 further comprises a related service and request mapping user interface element 1022. In some embodiments, the related service and request mapping user interface element 1022 may be in the form of a button. In some embodiments, when a user clicks, taps, and/or otherwise selects the related service and request mapping user interface element 1022, the incident and change management user interface may be updated to provide a related service and incident mapping user interface.

Referring now to FIG. 11, an updated incident and change management user interface 1100 in accordance with various embodiments of the present disclosure is illustrated. In particular, the updated incident and change management user interface 1100 comprises a related service and incident mapping user interface 1105 that graphically illustrates a service user interface icon corresponding to the service data object associated with the ticket data object (for example, associated with the change ticket data object represented in the change ticket user interface pane 1002 described above in connection with FIG. 10), service user interface icon(s) corresponding to related service data object(s) of the service data object, as well as ticket user interface icon(s) that are related to the service data object or the related service data object(s).

In the example shown in FIG. 11, the related service and incident mapping user interface 1105 may comprise a service user interface icon 1101A. In some embodiments, the processing circuitry may generate the service user interface icon 1101A corresponding to the service data object associated with the ticket data object (for example, associated with the change ticket data object represented in the change ticket user interface pane 1002 described above in connection with FIG. 10). For example, the service user interface icon 1101A may indicate that the service data object associated with the ticket data object represents transaction service.

In some embodiments, the processing circuitry may determine one or more related ticket data objects associated with the service data object represented by the service user interface icon 1101A. For example, the processing circuitry may determine the one or more related ticket data objects based at least in part on the affected service data fields of the ticket data objects, similar to those described above in connection with at least FIG. 4 to FIG. 9. In some embodiments, the processing circuitry may determine one or more related ticket data objects comprising at least one incident ticket data object, and may generate an incident user interface icon 1103A. In some embodiments, the processing circuitry may position the incident user interface icon 1103A adjacent to the service user interface icon 1101A, which indicates that the transaction service has encountered an incident. Additionally, or alternatively, the processing circuitry may determine one or more related ticket data objects comprising at least one change ticket data object, may generate a change user interface icon, and may position the change user interface icon adjacent to the service user interface icon 1101A.

In some embodiments, the processing circuitry may determine one or more related service data objects. For example, the processing circuitry may determine one or more child service data objects that depend on the service data object represented by the service user interface icon 1101A. Additionally, or alternatively, the processing circuitry may determine one or more parent service data objects upon which the service data object represented by the service user interface icon 1101A depends. For example, the processing circuitry may determine the one or more child service data objects and the one or more parent service data objects based at least in part on the related service data field of the service data object, similar to those described above in connection with at least FIG. 4 to FIG. 9. In some embodiments, the processing circuitry may generate a service user interface element for each parent service data object upon which the service data object represented by the service user interface icon 1101A depends, and may connect the service user interface icon(s) to the service user interface icon 1101A. Additionally, or alternatively, the processing circuitry may generate a service user interface element for each child service data object that depends on the service data object represented by the service user interface icon 1101A, and may connect the service user interface element(s) to the service user interface icon 1101A.

In the example shown in FIG. 11, the processing circuitry may generate a service user interface icon 1101B that corresponds to a service data object representing accounts service. In the examples shown in FIG. 11, the service user interface icon 1101A is graphically connected to the service user interface icon 1101B. For example, the connection between the service user interface icon 1101A and the service user interface icon 1101B may indicate a dependency relationship between the service represented by the service user interface icon 1101A and the service represented by the service user interface icon 1101B based at least in part on the related service data fields as described above. In the example shown in FIG. 11, the connection between the service user interface icon 1101A and the service user interface icon 1101B indicates that the accounts service depends on the transaction service.

In some embodiments, the above process may be repeated by the processing circuitry to identify grandchild service data objects based on each child service data object, and to generate service user interface icons for these grandchild service data objects. For example, each child service data object may comprise a related service data field that indicates a grandchild service data object. In the example shown in FIG. 11, the service data object corresponding to the "billing-apigateway" service is a child service data object of the service data object corresponding to the "accounts service," and is a grandchild service data object of the service data object corresponding to the "transaction service." In some embodiments, the above process may be repeated by the processing circuitry to identify grandparent service data objects based on each parent service data object, and to generate service user interface icons for these grandparent service data objects.

In some embodiments, the processing circuitry may determine one or more related ticket data objects associated with the service data object represented by the service user interface icon 1101B that are child service data objects of the service data object represented by the service user interface icon 1101A. Additionally, or alternatively, the processing circuitry may determine one or more related ticket data objects associated with the service data object represented by service user interface icon(s) that are parent service data objects of the service data object represented by the service user interface icon 1101A. For example, the processing circuitry may determine the one or more related ticket data objects based at least in part on the affected service data fields of the ticket data objects, similar to those described above in connection with at least FIG. 4 to FIG. 9. In some embodiments, the processing circuitry may determine one or more related ticket data objects comprising at least one incident ticket data object, and may generate an incident user interface icon 1103B. In some embodiments, the processing circuitry may position the incident user interface icon 1103B adjacent to the service user interface icon 1101B, which indicates that the accounts service has encountered an incident. Additionally, or alternatively, the processing circuitry may determine one or more related ticket data objects comprising at least one change ticket data object, may generate a change ticket user interface icon, and may position the change ticket user interface icon adjacent to the service user interface icon 1101B.

In some embodiments, the above process may be repeated by the processing circuitry to identify related ticket data objects associated with each grandchild service data object and/or each grandparent service data object, and to generate incident indicator(s) and/or change indicator(s), as applicable.

In some embodiments, the related service and incident mapping user interface 1105 may comprise a view control panel 1107. In some embodiments, the view control panel 1107 may comprise one or more buttons that provide options for adjusting the presentation of the related service and incident mapping user interface 1105.

In some embodiments, in response to receiving a user selection of the service user interface icon 1101A of the related service and incident mapping user interface 1105, the updated incident and change management user interface 1100 may display a service user interface pane 1121.

In some embodiments, the service user interface pane 1121 may comprise one or more portions or sub-panes. For example, the service user interface pane 1121 may comprise a service title sub-pane 1109, a service option menu portion 1111, a related service and ticket sub-pane 1113, and a description sub-pane 1119.

In some embodiments, the service title sub-pane 1109 graphically displays a name of a service data object whose corresponding service user interface icon is selected in the related service and incident mapping user interface 1105. In the example shown in FIG. 11, the service title sub-pane 1109 indicates that the service data object selected in the related service and incident mapping user interface 1105 represents the transaction service.

In some embodiments, the service option menu portion 1111 graphically displays options for viewing information associated with the selected service data object. For example, the service option menu portion 1111 may include an option for viewing details associated with the service data object, activity associated with the service data object, linked issues associated with the service data object, attachments associated with the service data object, and/or the like.

In the example shown in FIG. 11, the "details" option in the service option menu portion 1111 is selected. In such an example, details associated with the service data object whose corresponding service user interface icon is selected in the related service and incident mapping user interface 1105 are displayed.

For example, the description sub-pane 1119 displays the key information, the description information, the tier information, and/or the like of the service data object selected in the related service and incident mapping user interface 1105.

In some embodiments, the description sub-pane 1119 further comprises a related service sub-pane 1123. In some embodiments, the related service sub-pane 1123 may be generated based at least in part on the related service data field of the service data object whose corresponding service user interface icon is selected in the related service and incident mapping user interface 1105.

In some embodiments, the related service and ticket sub-pane 1113 graphically displays related service incident notifications associated with the service data object whose corresponding service user interface icon is selected in the related service and incident mapping user interface 1105. For example, the processing circuitry may generate the related service and ticket sub-pane 1113 in accordance with various example embodiments described herein, including but not limited to, those described above in connection with at least FIG. 4 to FIG. 9. In some embodiments, the related service and ticket sub-pane 1113 may comprise an incident user interface icon 1117 that graphically displays service incident notification associated with the service data object, as well as a service user interface icon 1125 that graphically displays the related service data object where the incident happens.

In some embodiments, a user may click, tap, and/or otherwise select the incident user interface icon 1117, and the incident and change management user interface may be updated to display more details associated with the incident. In some embodiments, a user may click, tap, and/or otherwise select the service user interface icon 1125, and the incident and change management user interface may be updated to display more details associated with the service.

In some embodiments, when a user clicks or selects the "activity" menu option in the service option menu portion 1111, the service user interface pane 1121 may be updated to display an activity timeline user interface sub-pane. Referring now to FIG. 12, an example service user interface pane 1200 that comprises an activity timeline user interface sub-pane 1202 is illustrated.

In the example shown in FIG. 12, the activity timeline user interface sub-pane 1202 comprises a timeline interface element 1204 and one or more ticket user interface elements (such as, but not limited to, ticket user interface element 1206A and ticket user interface element 1206B). In some embodiments, each of the one or more ticket user interface elements may be generated based on a related ticket data object of the service data object. As described above, each ticket data object may comprise a ticket time data field, and the one or more ticket user interface elements (such as, but not limited to, ticket user interface element 1206A and ticket user interface element 1206B) may be arranged along the timeline interface element 1204 based on their corresponding ticket time data fields.

While the description above provides examples of user interfaces that can be generated by an example integrated service and asset management platform in accordance with various examples of the present disclosure, it is noted that the scope of the present disclosure is not limited to the description above. In some examples, an example integrated service and asset management platform may generate one or more additional and/or alternative user interfaces, and/or one or more additional and/or alternative user interface elements.

For example, as shown in FIG. 13, an example integrated service and asset management platform may generate a related service and ticket sub-pane 1300 that can be part of an example incident and change management user interface.

In the example shown in FIG. 13, the related service and ticket sub-pane 1300 is generated for a service data object that corresponds to transaction service. In some embodiments, the related service and ticket sub-pane 1300 may categorize the related ticket data objects based on the service data objects that they are associated with. For example, related service and ticket sub-pane 1300 may comprise a first portion 1301 that includes change ticket user interface elements associated with the transaction service, and may include a second portion 1303 that includes change ticket user interface elements associated with the accounts service. In this example, the accounts service is a related service of the transaction service, which can be determined in accordance with various examples described herein. As such, the example shown in FIG. 13 allows a user to easily view related service data objects and ticket data objects.

The example incident and change management user interfaces shown from FIG. 10 to FIG. 13 illustrate various technical advantages and benefits of various embodiments of the present disclosure. For example, the example incident and change management user interface 1000 shown in FIG. 10 may be provided to a change approver. As shown through the transitions from FIG. 10 to FIG. 11 (and to FIG. 12 and/or to FIG. 13), various embodiments of the present disclosure provide an intuitive way for a change approver to review incidents in related services in deciding whether to approve a service change request.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output.

Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device).

Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for generating an incident and change management user interface associated with an integrated service and asset management platform, wherein the integrated service and asset management platform is associated with a plurality of service data objects and a plurality of ticket data objects, wherein the apparatus comprises at least one processor and at least one non-transitory memory comprising program code, wherein the at least one non-transitory memory and the program code are configured to, with the at least one processor, cause the apparatus to at least:

53

54 receive, from a client device, a ticket data object comprising an affected service data field indicating a service data object from the plurality of service data objects, wherein the ticket data object corresponds to a change ticket data object that indicates a service change request associated with the service data object;

in response to receiving the ticket data object, identify at least one related service data object from the plurality of service data objects based at least in part on the affected service data field of the ticket data object;

cause rendering, on the client device, the incident and change management user interface that indicates the service change request and comprises a related service and request mapping user interface element;

in response to receiving a user selection of the related service and request mapping user interface element, update the incident and change management user interface by rendering a related service and incident mapping user interface that comprises a plurality of service user interface icons and illustrates dependency associated with the service data object and the at least one related service data object; and dynamically update the related service and incident mapping user interface based on the ticket data object by rendering an incident user interface icon adjacent to a service user interface icon corresponding to the service data object on the related service and incident mapping user interface.

2. The apparatus of claim 1, wherein the ticket data object comprises an incident ticket data object, wherein the incident ticket data object indicates at least one service incident notification associated with the service data object, wherein the at least one non-transitory memory and the program code are configured to, with the at least one processor, cause the apparatus to select at least one related ticket data object from the plurality of ticket data objects.

3. The apparatus of claim 2, wherein the at least one related ticket data object comprises at least one related change ticket data object, wherein the at least one related change ticket data object indicates at least one related service change request associated with the service data object or the at least one related service data object.

4. The apparatus of claim 2, wherein the at least one related ticket data object comprises at least one related incident ticket data object, wherein the at least one related incident ticket data object indicates at least one related service incident notification associated with the service data object or the at least one related service data object.

5. The apparatus of claim 1, wherein the at least one non-transitory memory and the program code are configured to, with the at least one processor, cause the apparatus to select at least one related ticket data object from the plurality of ticket data objects, wherein the at least one related ticket data object comprises at least one related incident ticket data object, wherein the at least one related incident ticket data object indicates at least one related service incident notification associated with the service data object or the at least one related service data object.

6. The apparatus of claim 1, wherein the at least one non-transitory memory and the program code are configured to, with the at least one processor, cause the apparatus to select at least one related ticket data object from the plurality of ticket data objects, wherein the at least one related ticket data object comprises at least one related change ticket data object, wherein the at least one related change ticket data object indicates at least one related service change request associated with the service data object or the at least one related service data object.

7. The apparatus of claim 1, wherein the at least one non-transitory memory and the program code are configured to, with the at least one processor, cause the apparatus to:

select at least one related ticket data object from the plurality of ticket data objects, wherein a corresponding affected service data field of each of the at least one related ticket data object indicates one of the service data object or the at least one related service data object, wherein the related service and incident mapping user interface comprises at least one incident user interface icon corresponding to the at least one related ticket data object.

8. A computer-implemented method for generating an incident and change management user interface associated with an integrated service and asset management platform, wherein the integrated service and asset management platform is associated with a plurality of service data objects and a plurality of ticket data objects, wherein the computer-implemented method comprises:

receiving, from a client device, a ticket data object comprising an affected service data field indicating a service data object from the plurality of service data objects, wherein the ticket data object corresponds to a change ticket data object that indicates a service change request associated with the service data object;

in response to receiving the ticket data object, identifying at least one related service data object from the plurality of service data objects based at least in part on the affected service data field of the ticket data object;

causing rendering, on the client device, the incident and change management user interface that indicates the service change request and comprises a related service and request mapping user interface element;

in response to receiving a user selection of the related service and request mapping user interface element, updating the incident and change management user interface by rendering a related service and incident mapping user interface that comprises a plurality of service user interface icons and illustrates dependency associated with the service data object and the at least one related service data object; and dynamically updating the related service and incident mapping user interface based on the ticket data object by rendering an incident user interface icon adjacent to a service user interface icon corresponding to the service data object on the related service and incident mapping user interface.

9. The computer-implemented method of claim 8, wherein the ticket data object comprises an incident ticket data object, wherein the incident ticket data object indicates at least one service incident notification associated with the service data object, wherein the computer-implemented method further comprises selecting at least one related ticket data object from the plurality of ticket data objects.

10. The computer-implemented method of claim 9, wherein the at least one related ticket data object comprises at least one related change ticket data object, wherein the at least one related change ticket data object indicates at least one related service change request associated with the service data object or associated with the at least one related service data object.

11. The computer-implemented method of claim 9, wherein the at least one related ticket data object comprises at least one related incident ticket data object, wherein the at least one related incident ticket data object indicates at least one related service incident notification associated with the service data object or associated with the at least one related service data object.

12. The computer-implemented method of claim 8, further comprising selecting at least one related ticket data object from the plurality of ticket data objects, wherein the at least one related ticket data object comprises at least one related incident ticket data object, wherein the at least one related incident ticket data object indicates at least one related service incident notification associated with the service data object or associated with the at least one related service data object.

13. The computer-implemented method of claim 8, further comprising selecting at least one related ticket data object from the plurality of ticket data objects, wherein the at least one related ticket data object comprises at least one related change ticket data object, wherein the at least one related change ticket data object indicates at least one related service change request associated with the service data object or associated with the at least one related service data object.

14. The computer-implemented method of claim 8, further comprising:

selecting at least one related ticket data object from the plurality of ticket data objects, wherein a corresponding affected service data field of each of the at least one related ticket data object indicates one of the service data object or the at least one related service data object, wherein the related service and incident mapping user interface comprises at least one incident user interface icon corresponding to the at least one related ticket data object.

15. A computer program product for generating an incident and change management user interface associated with an integrated service and asset management platform, wherein the integrated service and asset management platform is associated with a plurality of service data objects and a plurality of ticket data objects, the computer program product comprising at least one non-transitory computer-readable storage medium having computer-readable program code portions stored therein, the computer-readable program code portions comprising an executable portion configured to:

receive, from a client device, a ticket data object comprising an affected service data field indicating a service data object from the plurality of service data objects, wherein the ticket data object corresponds a change ticket data object that indicates a service change request associated with the service data object;

in response to receiving the ticket data object, identify at least one related service data object from the plurality of service data objects based at least in part on the affected service data field of the ticket data object;

cause rendering, on the client device, the incident and change management user interface that indicates the service change request and comprises a related service and request mapping user interface element;

in response to receiving a user selection of the related service and request mapping user interface element, update the incident and change management user interface by rendering a related service and incident mapping user interface that comprises a plurality of service user interface icons and illustrates dependency associated with the service data object and the at least one related service data object; and dynamically update the related service and incident mapping user interface based on the ticket data object by rendering an incident user interface icon adjacent to a service user interface icon corresponding to the service data object on the related service and incident mapping user interface.

16. The computer program product of claim 15, wherein the ticket data object comprises an incident ticket data object, wherein the incident ticket data object indicates at least one service incident notification associated with the service data object, wherein the computer-readable program code portions comprise the executable portion configured to select at least one related ticket data object from the plurality of ticket data objects.

17. The computer program product of claim 16, wherein the at least one related ticket data object comprises at least one related change ticket data object, wherein the at least one related change ticket data object indicates at least one related service change request associated with the service data object or the at least one related service data object.

18. The computer program product of claim 16, wherein the at least one related ticket data object comprises at least one related incident ticket data object, wherein the at least one related incident ticket data object indicates at least one related service incident notification associated with the service data object or the at least one related service data object.

19. The computer program product of claim 15, wherein the computer-readable program code portions comprise the executable portion configured to select at least one related ticket data object from the plurality of ticket data objects, wherein the at least one related ticket data object comprises at least one related incident ticket data object, wherein the at least one related incident ticket data object indicates at least one related service incident notification associated with the service data object or the at least one related service data object.

20. The computer program product of claim 15, wherein the computer-readable program code portions comprise the executable portion configured to:

select at least one related ticket data object from the plurality of ticket data objects, wherein a corresponding affected service data field of each of the at least one related ticket data object indicates one of the service data object or the at least one related service data object, wherein the related service and incident mapping user interface comprises at least one incident user interface icon corresponding to the at least one related ticket data object.

* * * * *